(12) United States Patent
Chang et al.

(10) Patent No.: US 10,908,415 B2
(45) Date of Patent: Feb. 2, 2021

(54) ANNULAR OPTICAL COMPONENT, CAMERA LENS AND IMAGE CAPTURING UNIT

(71) Applicant: LARGAN PRECISION CO.,LTD., Taichung (TW)

(72) Inventors: Ming-Shun Chang, Taichung (TW); Yu-Jen Chiu, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 146 days.

(21) Appl. No.: 16/024,120

(22) Filed: Jun. 29, 2018

(65) Prior Publication Data

US 2019/0324267 A1 Oct. 24, 2019

(30) Foreign Application Priority Data

Apr. 20, 2018 (TW) .............................. 107113500 A

(51) Int. Cl.
| | |
|---|---|
| *G02B 27/00* | (2006.01) |
| *G02B 7/02* | (2006.01) |
| *G03B 13/36* | (2006.01) |
| *G03B 5/00* | (2006.01) |

(52) U.S. Cl.
CPC ......... *G02B 27/0018* (2013.01); *G02B 7/021* (2013.01); *G03B 5/00* (2013.01); *G03B 13/36* (2013.01)

(58) Field of Classification Search
CPC .... G02B 27/0018; G02B 7/021; G03B 13/36; G03B 5/00

USPC ........................................................ 359/738
See application file for complete search history.

(56) References Cited

U.S. PATENT DOCUMENTS

| | | | | |
|---|---|---|---|---|
| 7,423,811 | B2 * | 9/2008 | Silver ...................... | G02B 3/14 |
| | | | | 359/666 |
| 8,248,701 | B1 * | 8/2012 | Hwu ...................... | G02B 7/021 |
| | | | | 359/618 |
| 9,581,784 | B2 | 2/2017 | Ishiguri et al. | |
| 2006/0098307 | A1 * | 5/2006 | Campean ............... | G02B 7/006 |
| | | | | 359/819 |
| 2009/0268315 | A1 * | 10/2009 | Chou ...................... | G02B 7/026 |
| | | | | 359/819 |
| 2011/0122511 | A1 * | 5/2011 | Sasaki .................... | G02B 7/028 |
| | | | | 359/738 |

(Continued)

*Primary Examiner* — James R Greece
(74) *Attorney, Agent, or Firm* — Maschoff Brennan

(57) ABSTRACT

An annular optical component includes a plastic element and a metal element disposed on the plastic element. The plastic element includes a plastic part, and the metal element includes a metal part. The plastic part surrounds a central axis of the annular optical component so as to form a central opening. An outer annular surface and an inner annular surface of the annular optical component are opposite to each other. An object-side surface of the annular optical component faces an image-side direction of the annular optical component and is connected to the outer annular surface and the inner annular surface. An image-side surface of the annular optical component faces an image-side direction of the annular optical component and is connected to the outer annular surface and the inner annular surface. The image-side surface and the object-side surface are opposite to each other.

14 Claims, 24 Drawing Sheets

(56) References Cited

U.S. PATENT DOCUMENTS

2014/0334019 A1\* 11/2014 Ishiguri ............ B29D 11/00009
                                                    359/738
2015/0070765 A1\* 3/2015 Lam ................... G02B 27/0006
                                                    359/508

\* cited by examiner

ANNULAR OPTICAL COMPONENT, CAMERA LENS AND IMAGE CAPTURING UNIT

RELATED APPLICATIONS

This application claims priority to Taiwan Application 107113500, filed on Apr. 20, 2018, which is incorporated by reference herein in its entirety.

BACKGROUND

Technical Field

The present disclosure relates to an annular optical component, a camera lens and an image capturing unit, more particularly to an annular optical component, a camera lens and an image capturing unit which are applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays.

Scattered light produced in an optical lens may seriously reduce the image quality. In detail, when a camera captures an object, strong light from an environment where the object is located will enter into the optical lens of the camera so as to produce scattered light. The scattered light will be absorbed by an image sensor of the camera and thus cause a halo on the periphery of the image. In order to reduce the scattered light, an optical component which has a specific shape or material is additionally assembled to the optical lens. However, the structural strength of the optical component is weak, thus the optical component is easily deformed and broken during the assembly of the optical lens.

SUMMARY

According one aspect of the present disclosure, an annular optical component includes a plastic element and a metal element disposed on the plastic element. The plastic element includes a plastic part, and the metal element includes a metal part. The plastic part includes at least part of an inner annular surface of the annular optical component, and the plastic part surrounds a central axis of the annular optical component so as to form a central opening. At least part of the metal part includes at least part of an outer annular surface of the annular optical component, and the outer annular surface and the inner annular surface are opposite to each other. An object-side surface of the annular optical component faces an image-side direction of the annular optical component and is connected to the outer annular surface and the inner annular surface. An image-side surface of the annular optical component faces an image-side direction of the annular optical component and is connected to the outer annular surface and the inner annular surface. The image-side surface and the object-side surface are opposite to each other. When a thickness of the metal part on the outer annular surface is d, and the maximum thickness of the annular optical component is t, the following condition is satisfied:

$$0.05 < d/t < 1.0.$$

According to another aspect of the present disclosure, a camera lens includes the aforementioned annular optical component and an imaging lens assembly. The annular optical component is disposed on the imaging lens assembly.

According to still another aspect of the present disclosure, a camera lens includes an imaging lens assembly and an annular optical component. The imaging lens assembly includes an object-side lens element and an image-side lens element. The annular optical component is disposed between the object-side lens element and the image-side lens element. The object-side lens element is disposed on an object-side direction of the annular optical component, and the image-side lens element is disposed on an image-side direction of the annular optical component. The annular optical component includes a plastic element and a metal element disposed on the plastic element. The plastic element includes a plastic part, and the metal element includes a metal part. The plastic part includes at least part of an inner annular surface of the annular optical component, and the plastic part surrounds a central axis of the annular optical component so as to form a central opening. An outer annular surface of the annular optical component and an inner annular surface are opposite to each other. An object-side surface of the annular optical component faces an object-side direction of the annular optical component and is connected to the outer annular surface and the inner annular surface. An image-side surface of the annular optical component faces an image-side direction of the annular optical component and is connected to the outer annular surface and the inner annular surface. The image-side surface and the object-side surface are opposite to each other. The metal part of the metal element extends from the outer annular surface to at least one of the object-side surface and the image-side surface, and the metal part on one of the object-side surface and the image-side surface is exposed.

According to yet another aspect of the present disclosure, an annular optical component includes a plastic element and a metal element. The metal element is insert-molded with the plastic element. The plastic element includes a plastic part, and the metal element includes at least one folding structure. The plastic part includes at least part of an inner annular surface of the annular optical component, and the plastic part surrounds a central axis of the annular optical component so as to form a central opening. An outer annular surface of the annular optical component and the inner annular surface are opposite to each other. An object-side surface of the annular optical component faces an object-side direction of the annular optical component and is connected to the outer annular surface and the inner annular surface. An image-side surface of the annular optical component faces an image-side direction of the annular optical component and is connected to the outer annular surface and the inner annular surface, and the image-side surface and the object-side surface are opposite to each other.

BRIEF DESCRIPTION OF THE DRAWINGS

The disclosure can be better understood by reading the following detailed description of the embodiments, with reference made to the accompanying drawings as follows.

DETAILED DESCRIPTION

Figure 26:
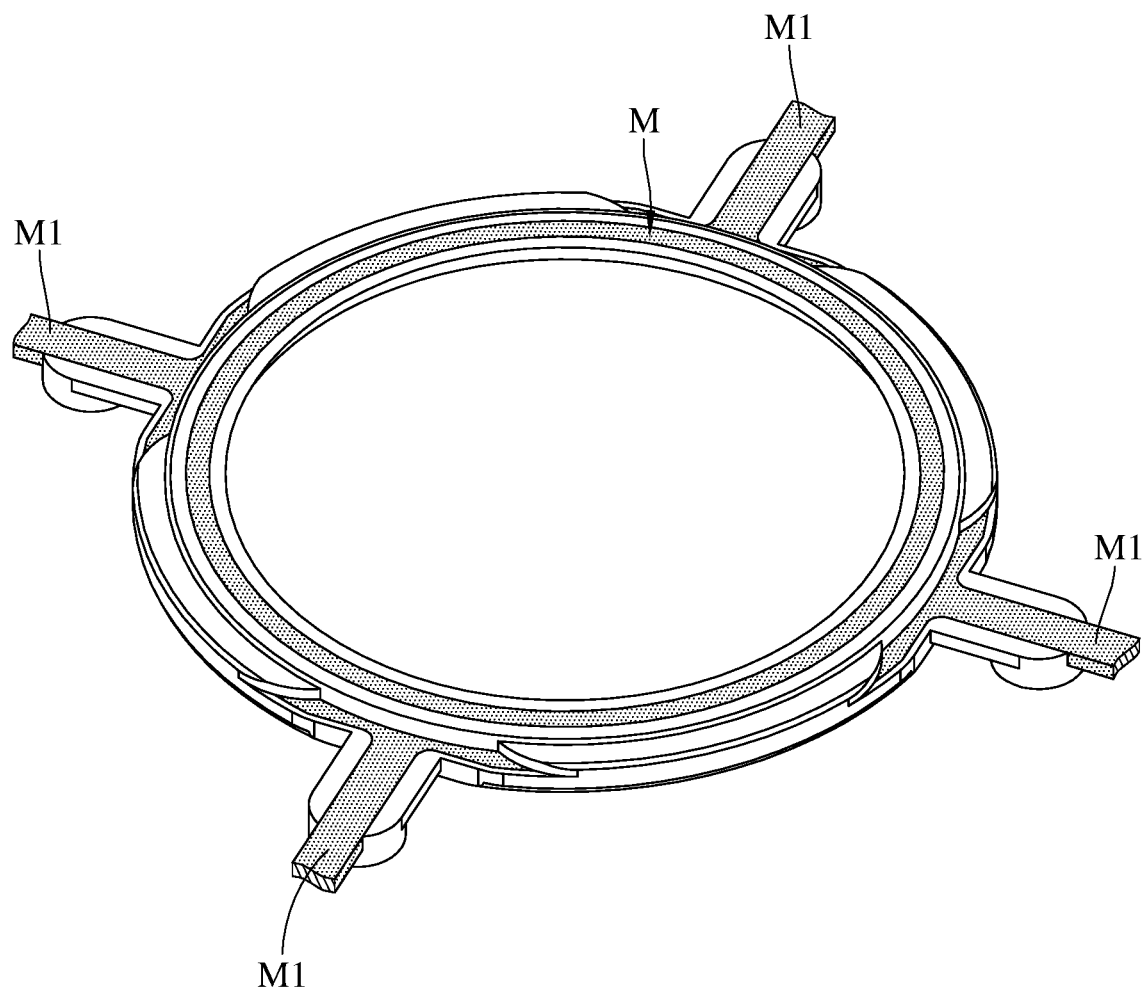
FIG. 26 is a schematic view of an annular optical component of the present disclosure which is made by insert-molding method.

An annular optical component of the disclosure can be manufactured by the insert-molding method. FIG. 26 is a schematic view of an annular optical component of the present disclosure which is made by insert-molding method. A metal frame M is placed in an injection mold, and a plurality of extension foots M1 of the metal frame M are fixed in channels where plastic material is injected. Then, the plastic material is injected into the injection mold from the channels to gradually coat the metal frame M. After the plastic material was cooled down, the remaining plastic material in the channels and the extension foots M1 are cut off, and then an annular optical component can be taken out from the injection mold. Cutting off the remaining plastic material and the extension foots M1 before taking the annular optical component from the injection mold helps to enhance manufacturing efficiency. As shown in FIG. 26, there are four extension foots M1 respectively located on the four channels. However, the present disclosure is not limited to the quantities of the extension foots and the channels.

The annular optical component includes a plastic element and a metal element which is disposed on the plastic element. The plastic element includes a plastic part, and the metal element includes a metal part. The plastic part includes at least part of an inner annular surface of the annular optical component, and the plastic part surrounds a central axis of the annular optical component so as to form a central opening. An outer annular surface of the annular optical component and the inner annular surface are opposite to each other. An object-side surface of the annular optical component faces an object-side direction of the annular optical component and is connected to the outer annular surface and the inner annular surface. An image-side surface of the annular optical component faces an image-side direction of the annular optical component and is connected to the outer annular surface and the inner annular surface, and the image-side surface and the object-side surface are opposite to each other. Therefore, the annular optical component of the disclosure includes the plastic element, which is taken as the main body of the annular optical component, and the metal element, which is configured to increase structural strength of the annular optical component, and the plastic element has a low reflectivity for decreasing reflection of scattered light. When an external force is applied on the annular optical component, the metal element helps to prevent the annular optical component from being deformed and broken. In addition, coating the plastic element on the metal element helps to compensate size tolerance of the metal element and thus to increase yield rate of manufacturing the annular optical component. As shown in FIG. 26, during the manufacturing process of the annular optical component, since the metal frame M is firmly fixed in the injection mold, the molded plastic element has a better quality, and which allows the outer annular surface of the annular optical component to have the metal part.

The plastic element can contain a chemical compound fiber. Therefore, during injecting process, the plastic material mixed with the chemical compound fiber has a better fluidity and thus helps to prevents poor molding quality.

The plastic part of the plastic element can include the entire inner annular surface of the annular optical component. In other words, the entire inner annular surface can be formed by the plastic part. Therefore, it is favorable for preventing scattered light form being produced due to the metal part having a high reflectivity.

The metal element can be disposed in the plastic element by insert-molded method. Therefore, it helps to design the injection mold and allows the metal element to be easily fixed in the injection mold, thereby decreasing molding difficulty.

At least part of the metal part of the metal element can include at least part of the outer annular surface of the annular optical component. When a thickness of the metal part of the metal element on the outer annular surface (i.e., a thickness of the metal part exposed from the outer annular surface) is d, and the maximum thickness of the annular optical component is t, the following condition can be satisfied: $0.05 < d/t < 1.0$. Therefore, the metal part which is thinner helps to increase the fluidity of the plastic material during the manufacturing process of the annular optical component, thereby helping to avoid molding defects. Preferably, the following condition can also be satisfied: $0.05<d/t<0.6$.

The metal element can include at least one folding structure. In other words, the metal element can be folded so as to form a circle-shaped structure or a plurality of circle-shaped structures which surround(s) the central opening of the annular optical component. Therefore, it is able to increase the structural strength of the metal element to resist an external force which is applied in a direction parallel to the central axis of the annular optical component, such that the annular optical component is not easily deformed by axial force. Preferably, the quantity of the folding structure may be equal to or larger than two, which helps to further increase the structural strength of the metal element so as to provide a better support to the annular optical component.

When a distance between the folding structures in a direction perpendicular to the central axis of the annular optical component is s, and the thickness of the metal part of the metal element on the outer annular surface is d, the following condition can be satisfied: $0.6<s/d<3.0$. Therefore, a shorter distance between the folding structures helps to provide a better support to the annular optical component, and thus the annular optical component has a better ability to against compression.

When the distance between the folding structures in the direction perpendicular to central axis of the annular optical component is s, and the maximum thickness of the annular optical component is t, the following condition can be satisfied: $0.05<s/t<1.0$. Therefore, the shorter distance between the folding structures helps the metal element to have a better ability to against external force.

The metal part of the metal element can extend from the outer annular surface to at least one of the object-side surface and the image-side surface, and the metal part on one of the object-side surface and the image-side surface can be exposed. Therefore, the exposed metal part can be directly in contact with other adjacent optical elements. Since the metal element undertakes most of the compressive assembly force, the plastic element is prevented from being compressed by external force, such that the annular optical component has a better structural strength.

The metal part can extend from the outer annular surface only to one of the object-side surface and the image-side surface. Therefore, the structure of the annular optical component can be simplified, such that the design of the injection mold is much easier so as to decrease the complexity of the injection molding.

The disclosure further provides a camera lens. The camera lens includes the aforementioned annular optical component and an imaging lens assembly, and the annular optical component is disposed on the imaging lens assembly. Preferably, the camera lens can further include a barrel member, a holding member or a combination of the barrel member and the holding member. When annular optical component is disposed on the imaging lens assembly, the object-side surface of the annular optical component faces an object side of the camera lens, and the image-side surface of the annular optical component faces an image side of the camera lens.

The imaging lens assembly of the disclosure includes an object-side lens element and an image-side lens element, and the annular optical component can be disposed between the object-side lens element and the image-side lens element. In detail, the object-side lens element is disposed on the object-side direction of the annular optical component, and the image-side lens element is disposed on the image-side direction of the annular optical component. Therefore, the distance between the two lens elements can be precisely maintained, and the annular optical component can undertake the compressive force generated during the assembly of the lens elements and does not break.

The camera lens of the disclosure further includes a light blocking film which is disposed between the image-side lens element and the annular optical component. The central opening of the annular optical component can be tapered from the image-side surface to the object-side surface. Therefore, the annular optical component cooperated with the light blocking film can form a light trap so as to decrease the chance of scattered light being reflected in the imaging lens assembly.

The annular optical component of the disclosure further includes an axially assembled structure which is located on the object-side surface or the image-side surface, and the annular optical component is disposed on the imaging lens assembly via the axially assembled structure. The axially assembled structure is configured to align the center of the annular optical component with the center of a lens element of the imaging lens assembly which is adjacent to the annular optical component. Therefore, a coaxality of the imaging lens assembly and an alignment accuracy between the annular optical component and the adjacent lens element can be increased so as to improve the resolution of the imaging lens assembly.

According to the present disclosure, the material of the plastic element can be PE, PVC, PS, PP, ABS or other resin materials. The material of the metal element can be copper, aluminum, zinc, stainless steel or alloy of above metals. The hardness of the metal element is greater than the hardness of the plastic element. The hardness of the metal element and the plastic element can be scratch hardness, indentation hardness or rebound hardness.

According to the present disclosure, the chemical compound fiber contained in the plastic element are, for example, polyamide fiber of NTB series which is reinforced by potassium titanate. The NTB series is the POTICON produced by Osaka Gas Chemical Corporation. The chemical compound fiber is not restricted in potassium titanate fiber. In some other embodiments, the chemical compound fiber may be a glass fiber.

According to the present disclosure, the metal element surrounds the central opening of the annular optical component, and the metal element has a uniform thickness.

According to the camera lens of the present disclosure, the light blocking film can be configured as a stop, such as a glare stop or a field stop which is set for eliminating the stray light and thereby improving the image quality thereof.

The aforementioned features of the present disclosure can be utilized in numerous combinations and are able to achieve corresponding effects.

According to the above descriptions of the present disclosure, the following specific embodiments are provided for further explanation.

1st Embodiment

Figure 1:
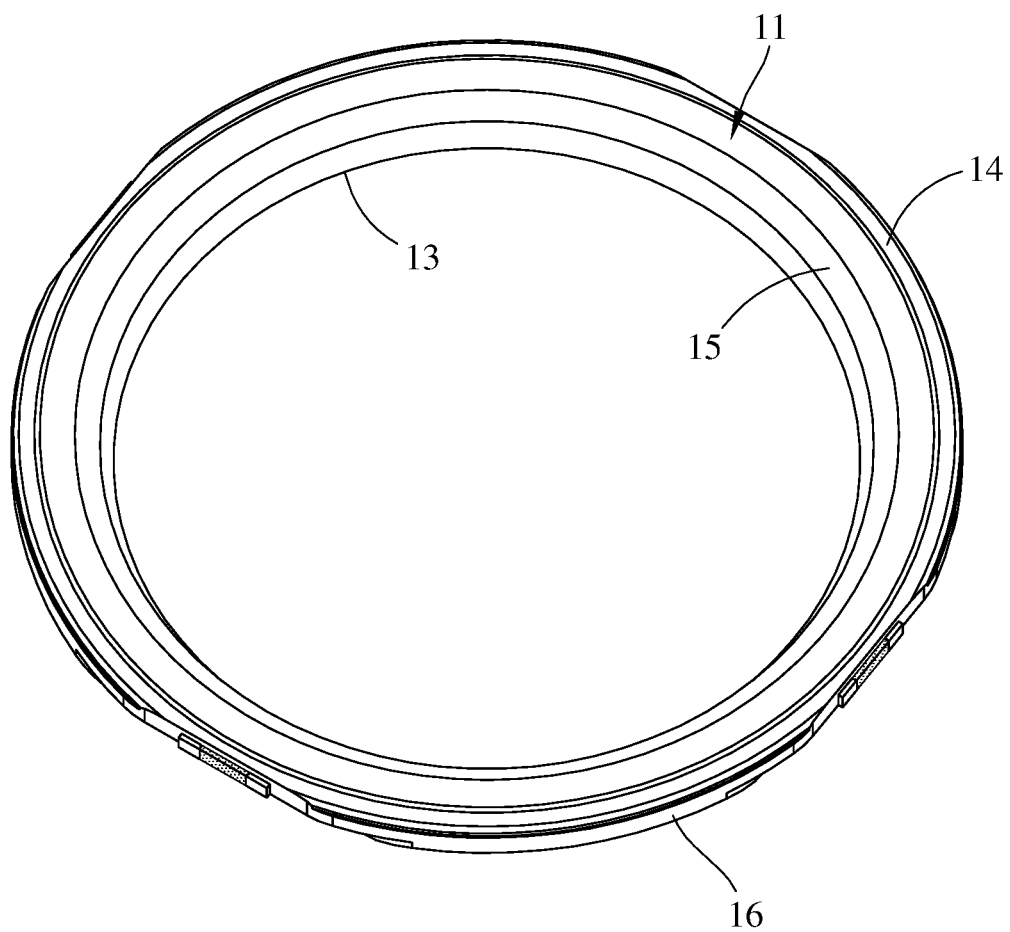
FIG. 1 is a perspective view of an annular optical component according to the 1st embodiment of the present disclosure.
Figure 2:
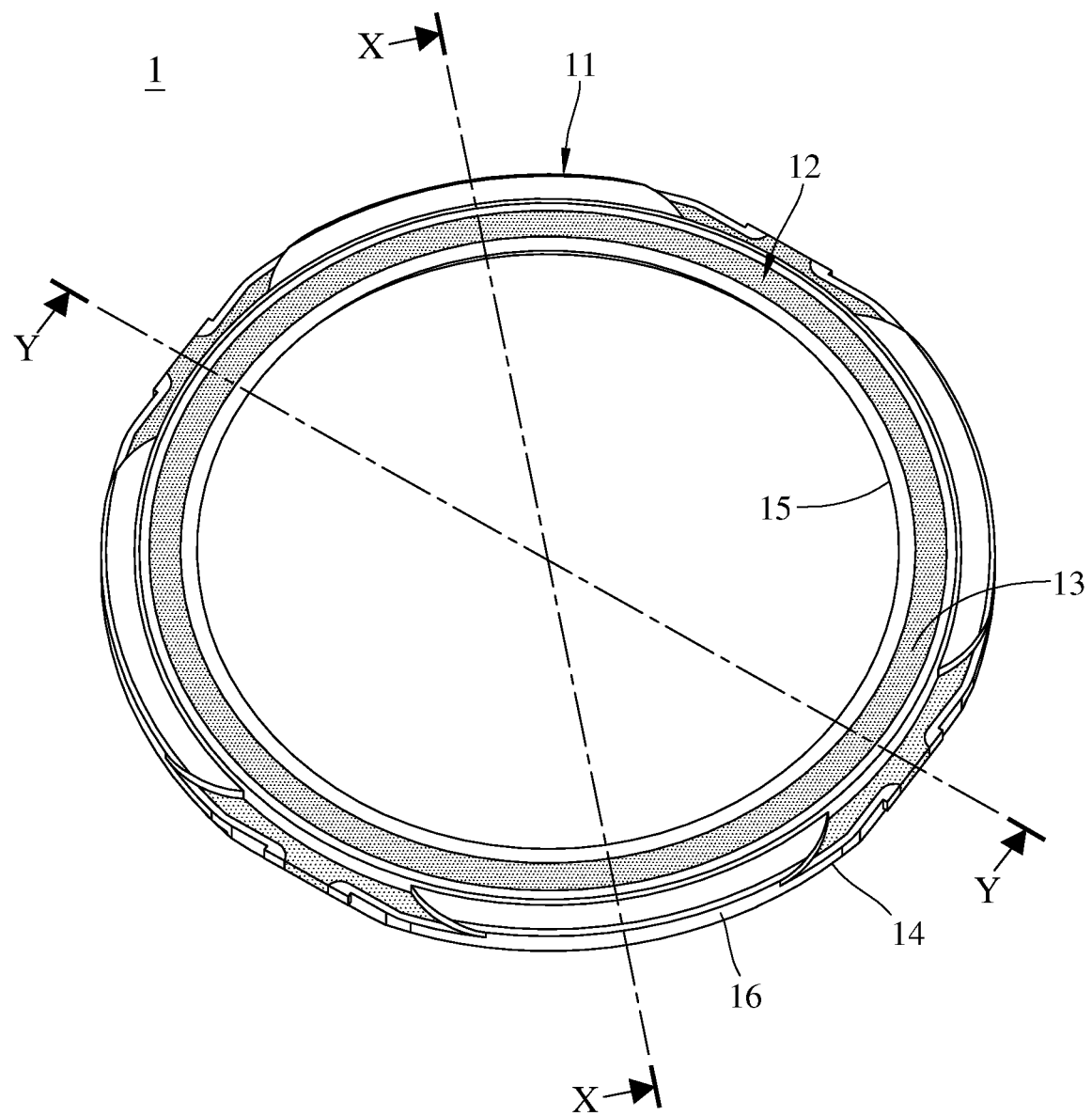
FIG. 2 is another perspective view of the annular optical component in FIG. 1.
Figure 3:
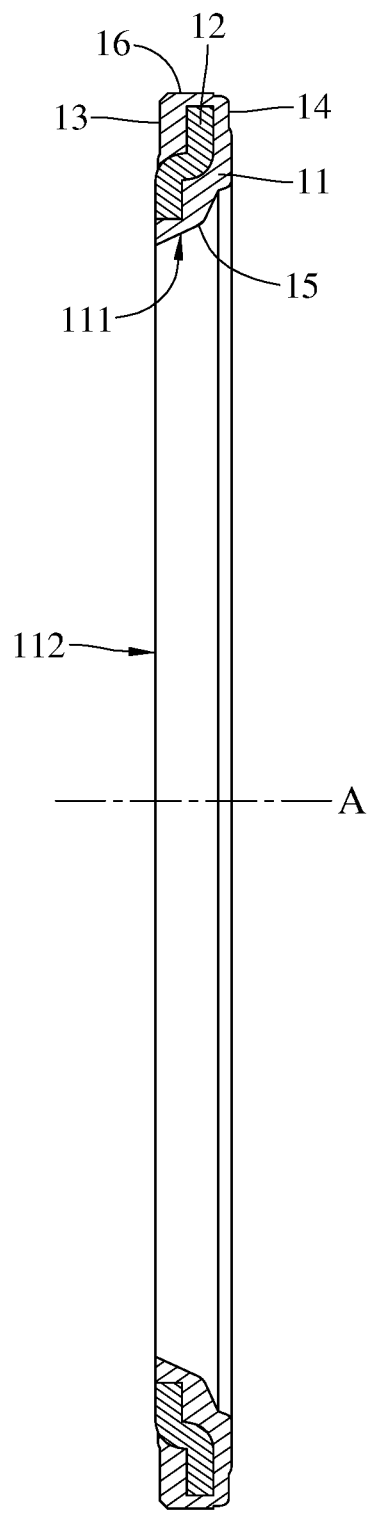
FIG. 3 is a cross-sectional view of the annular optical component in FIG. 2 along line X-X.
Figure 4:
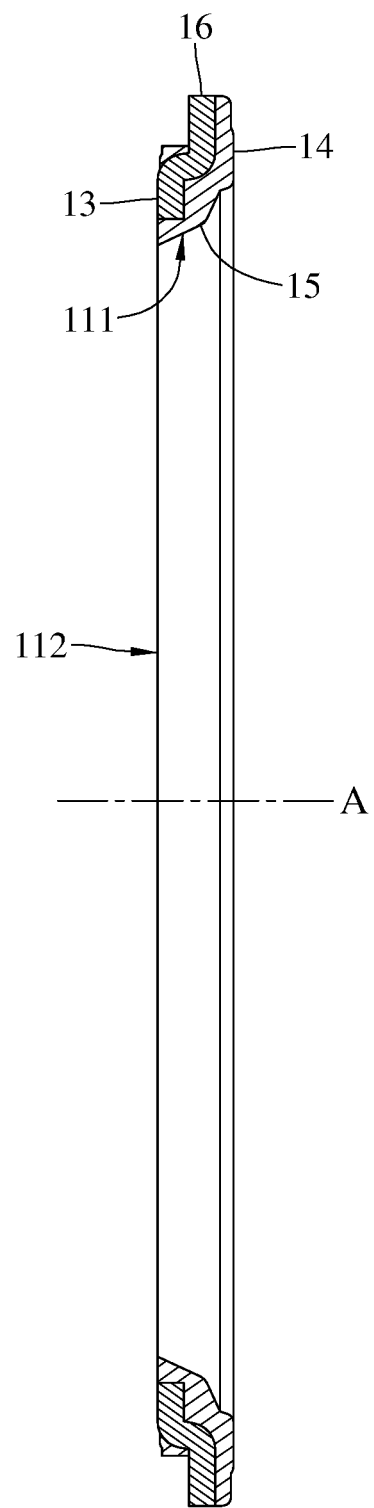
FIG. 4 is a cross-sectional view of the annular optical component in FIG. 2 along line Y-Y.

Please refer to FIG. 1 to FIG. 4. FIG. 1 is a perspective view of an annular optical component according to the 1st embodiment of the present disclosure. FIG. 2 is another perspective view of the annular optical component in FIG. 1. FIG. 3 is a cross-sectional view of the annular optical component in FIG. 2 along line X-X. FIG. 4 is a cross-sectional view of the annular optical component in FIG. 2 along line Y-Y. In this embodiment, an annular optical component 1 includes a plastic element 11 and a metal element 12. An object-side surface 13 of the annular optical component 1 faces an object-side direction of the annular optical component 1, and an image-side surface 14 of the annular optical component 1 faces an image-side direction of the annular optical component 1. The image-side surface 14 and the object-side surface 13 are opposite to each other, and both of the image-side surface 14 and the object-side surface 13 are connected to an inner annular surface 15 and an outer annular surface 16 of the annular optical component 1 which are opposite to each other.

The plastic element 11 includes a plastic part 111. The plastic part 111 includes the entire inner annular surface 15. The plastic part 111 surrounds a central axis A of the annular optical component 1 so as to form a central opening 112. The central opening 112 is tapered from the image-side surface 14 to the object-side surface 13. In this embodiment, the plastic element 11 contains a chemical compound fiber.

The metal element 12 is insert-molded with the plastic element 11. The metal element 12 surrounds the central opening 112 of the annular optical component 1, and the metal element 12 has a uniform thickness. The metal element 12 includes a metal part 121, and at least part of the metal part 121 includes part of the outer annular surface 16. In detail, the metal part 121 extends from the outer annular surface 16 to the object-side surface 13, and part of the metal part 121 on the object-side surface 13 is exposed. In this embodiment, the metal element 12 further includes two folding structures 122. The folding structures 122 are circle-shaped structures which surround the central opening 112 of the annular optical component 1.

Figure 5:
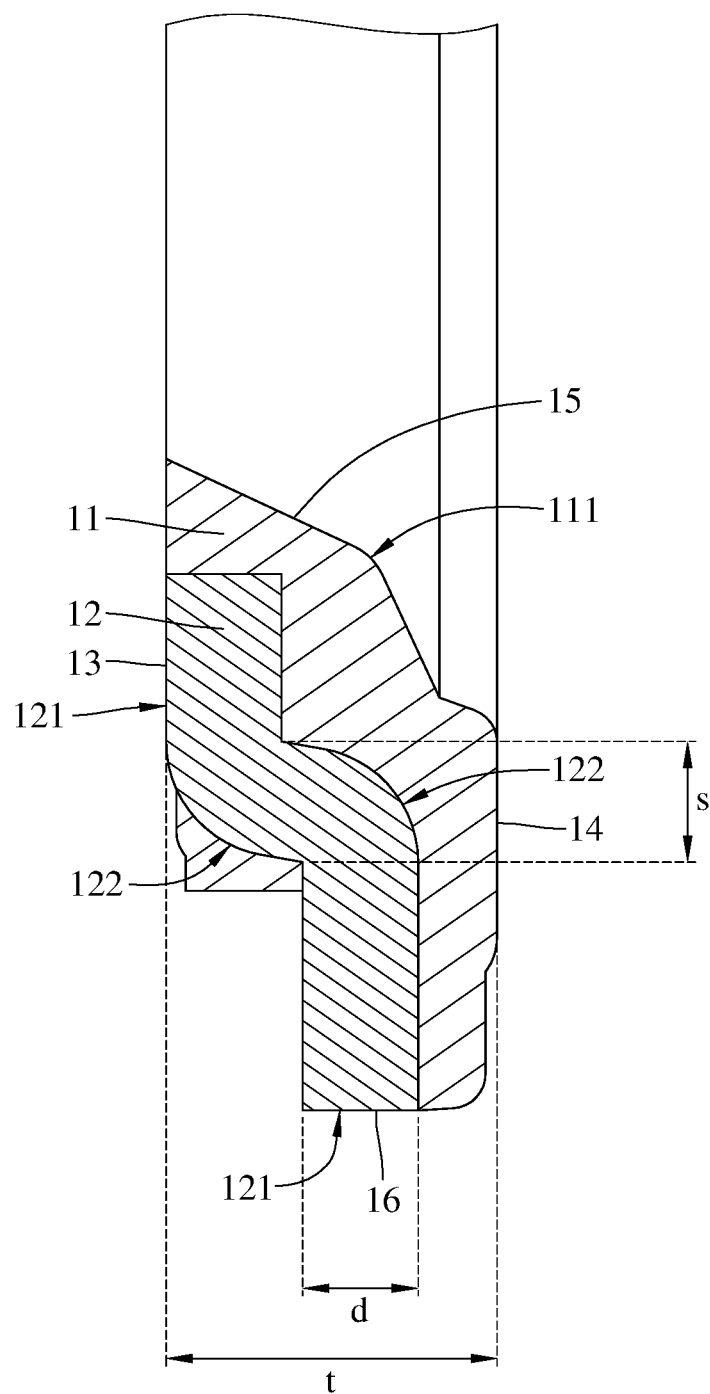
FIG. 5 is an enlarged view of the annular optical component in FIG. 4.

Please refer FIG. 5 and the aforementioned figures. FIG. 5 is an enlarged view of the annular optical component in FIG. 4. A thickness of the metal part 121 of metal element 12 on the outer annular surface 16 is d, the maximum thickness of the annular optical component 1 is t, and the following condition is satisfied: d/t=0.35.

A distance between the folding structures 122 of the metal element 12 in a direction perpendicular to the central axis A of the annular optical component 1 is s, a thickness of the metal part 121 of the metal element 12 on the outer annular surface 16 is d, and the following condition is satisfied: s/d=1.05.

The distance between the folding structures 122 in the direction perpendicular to the central axis A of the annular optical component 1 is s, the maximum thickness of the annular optical component 1 is t, and the following condition is satisfied: s/t=0.37.

2nd Embodiment

Figure 6:
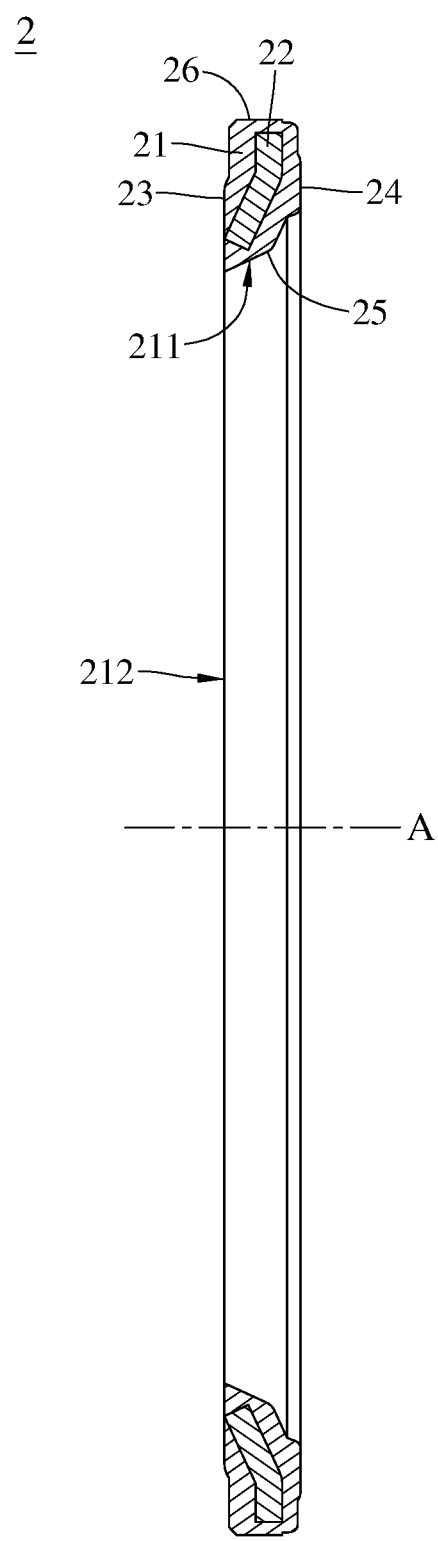
FIG. 6 is a cross-sectional view of the annular optical component according to the 2nd embodiment of the present disclosure.
Figure 7:
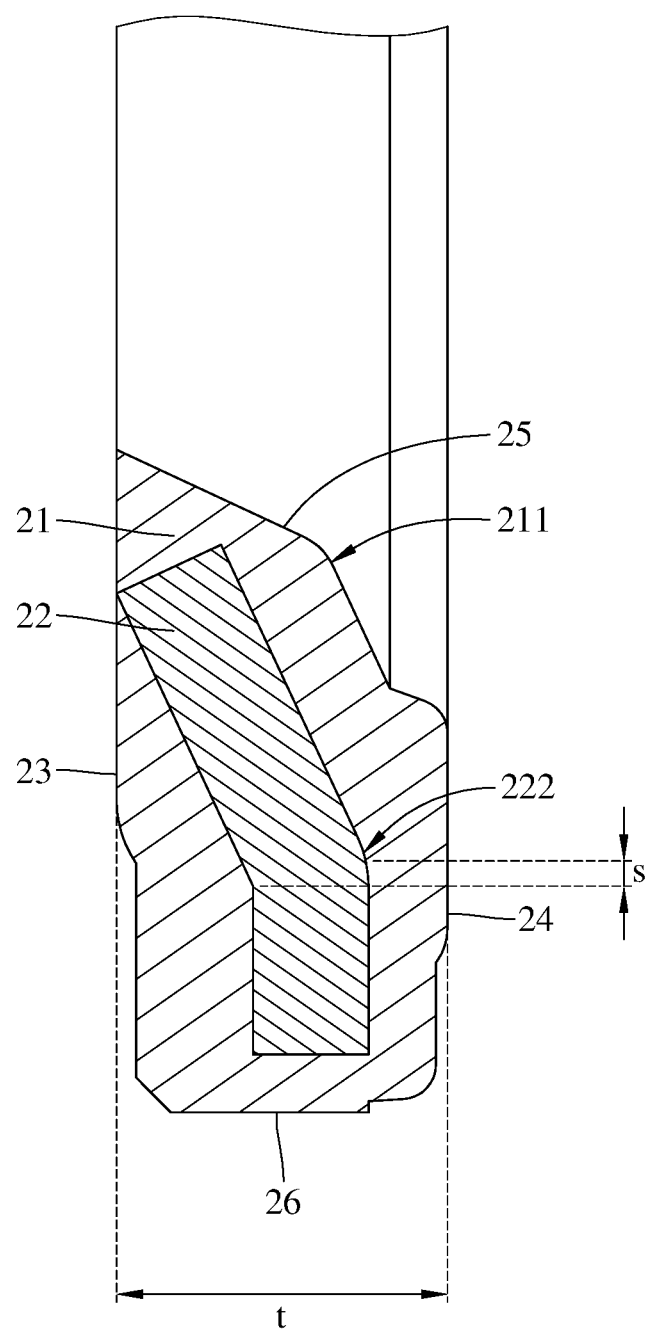
FIG. 7 is an enlarged view of the annular optical component in FIG. 6.

Please refer to FIG. 6 and FIG. 7. FIG. 6 is a cross-sectional view of the annular optical component according to the 2nd embodiment of the present disclosure. FIG. 7 is an enlarged view of the annular optical component in FIG. 6. In this embodiment, an annular optical component 2 includes a plastic element 21 and a metal element 22. An object-side surface 23 of the annular optical component 1 faces an object-side direction of the annular optical component 2, and an image-side surface 24 of the annular optical component 1 faces an image-side direction of the annular optical component 2. The image-side surface 24 and the object-side surface 23 are opposite to each other, and both of the image-side surface 24 and the object-side surface 23 are connected to an inner annular surface 25 and an outer annular surface 26 of the annular optical component 2 which are opposite to each other.

The plastic element 21 includes a plastic part 211. The plastic part 211 includes the entire inner annular surface 25. The plastic part 211 surrounds a central axis A of the annular optical component 2 so as to form a central opening 212. The central opening 212 is tapered from the image-side surface 24 to the object-side surface 23. In this embodiment, the plastic element 21 contains a chemical compound fiber.

The metal element 22 is insert-molded with the plastic element 21. The metal element 22 surrounds the central opening 212 of the annular optical component 2, and the metal element 22 has a uniform thickness. The plastic element 21 entirely covers the metal element 22, such that there is no side of the metal element 22 is exposed. In this embodiment, the metal element 22 includes a folding structure 222. The folding structure 222 is a circle-shaped structure which surrounds the central opening 212 of the annular optical component 2.

A length of the folding structure 222 in a direction perpendicular to the central axis A of annular optical component 2 is s, the maximum thickness of the annular optical component 2 is t, and following condition is satisfied: s/t=0.147.

3rd Embodiment

Figure 8:
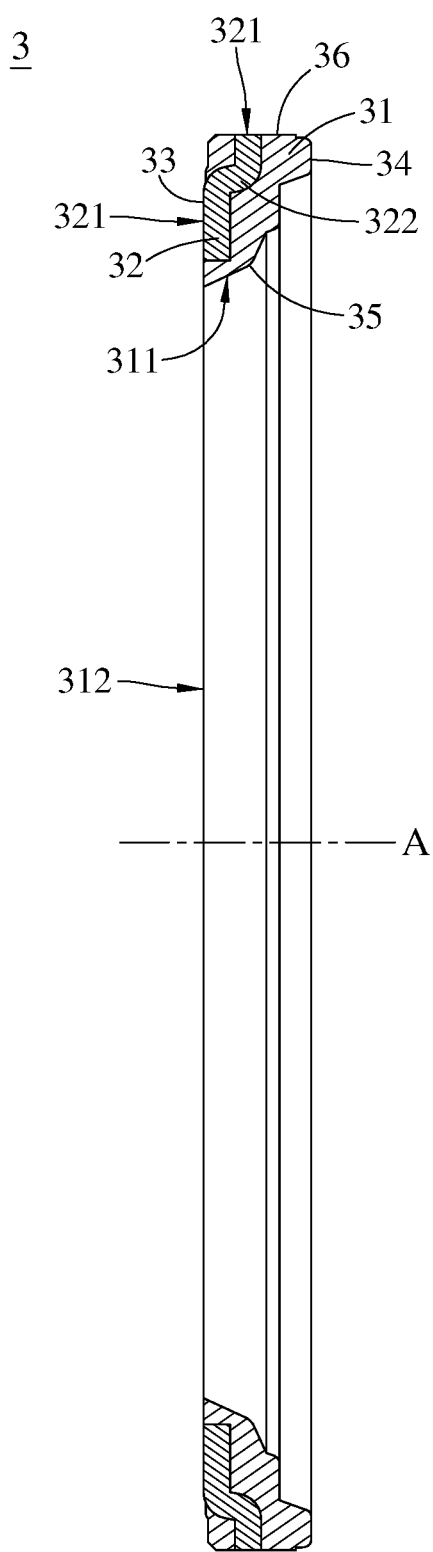
FIG. 8 is a cross-sectional view of the annular optical component according to the 3rd embodiment of the present disclosure.
Figure 9:
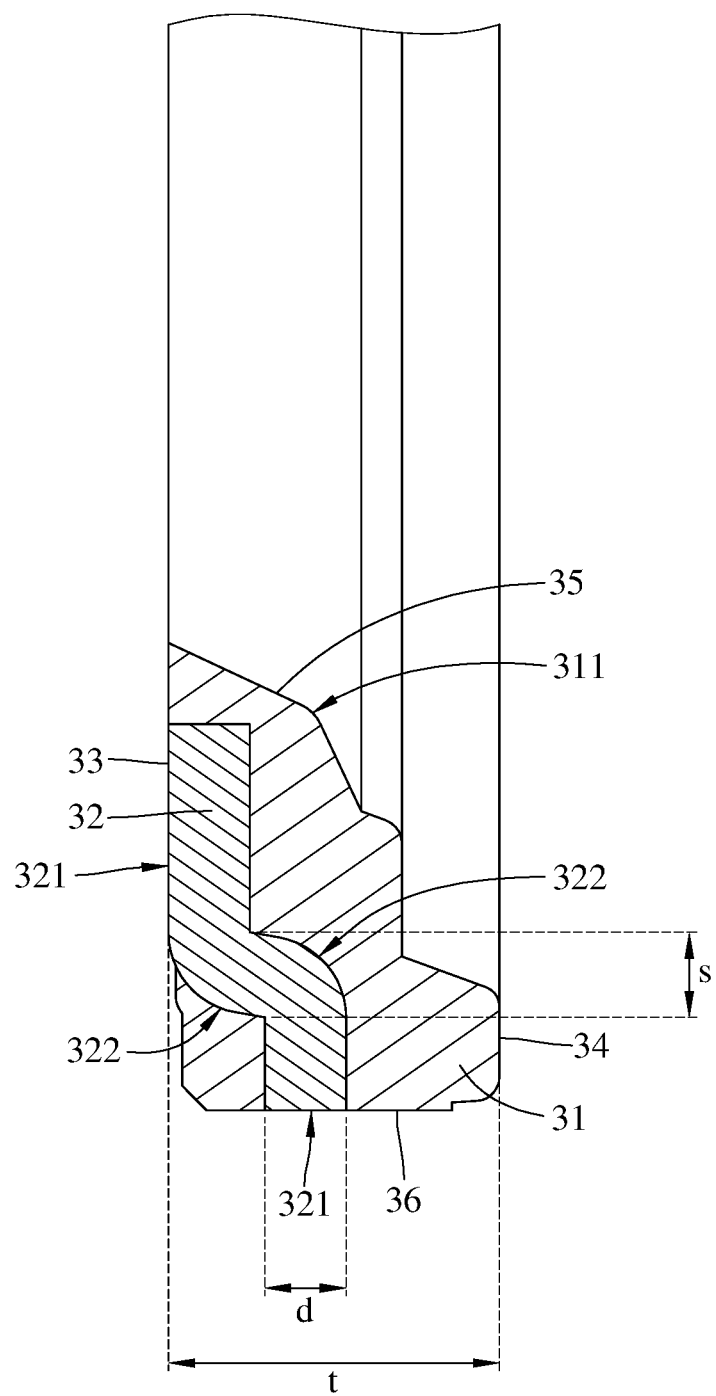
FIG. 9 is an enlarged view of the annular optical component in FIG. 8.

Please refer to FIG. 8 and FIG. 9. FIG. 8 is a cross-sectional view of the annular optical component according to the 3rd embodiment of the present disclosure. FIG. 9 is an enlarged view of the annular optical component in FIG. 8. In this embodiment, an annular optical component 3 includes a plastic element 31 and a metal element 32. An object-side surface 33 of the annular optical component 3 faces an object-side direction of the annular optical component 3, and an image-side surface 34 of the annular optical component 3 faces an image-side direction of the annular optical component 3. The image-side surface 34 and the object-side surface 33 are opposite to each other, and both of the image-side surface 34 and the object-side surface 33 are connected to an inner annular surface 35 and an outer annular surface 36 of the annular optical component 3 which are opposite to each other.

The plastic element 31 includes a plastic part 311. The plastic part 311 includes the entire inner annular surface 35. The plastic part 311 surrounds a central axis A of the annular optical component 3 so as to form a central opening 312. The central opening 312 is tapered from the image-side surface 34 to the object-side surface 33.

The metal element 32 is insert-molded with the plastic element 31. The metal element 32 surrounds the central opening 312 of the annular optical component 3, and the metal element 32 has a uniform thickness. The metal element 32 includes a metal part 321, and at least part of the metal part 321 includes part of the outer annular surface 36. In detail, the metal part 321 extends from the outer annular surface 36 to the object-side surface 33, and part of the metal part 321 on the object-side surface 33 is exposed. In this embodiment, the metal element 32 further includes two folding structures 322. The folding structures 322 are circle-shaped structures which surround the central opening 312 of the annular optical component 3.

A thickness of the metal part 321 of the metal element 32 on the outer annular surface 36 is d, the maximum thickness of the annular optical component 3 is t, and following condition is satisfied: d/t=0.25.

A distance between the folding structures 322 of the metal element 32 in a direction perpendicular to the central axis A of the annular optical component 3 is s, the thickness of the metal part 321 of the metal element 32 on the outer annular surface 36 is d, and the following condition is satisfied: s/d=1.05.

The distance between the folding structures 322 in the direction perpendicular to the central axis A of the annular optical component 3 is s, the maximum thickness of the annular optical component 3 is t, and the following condition is satisfied: s/t=0.26.

4th Embodiment

Figure 10:
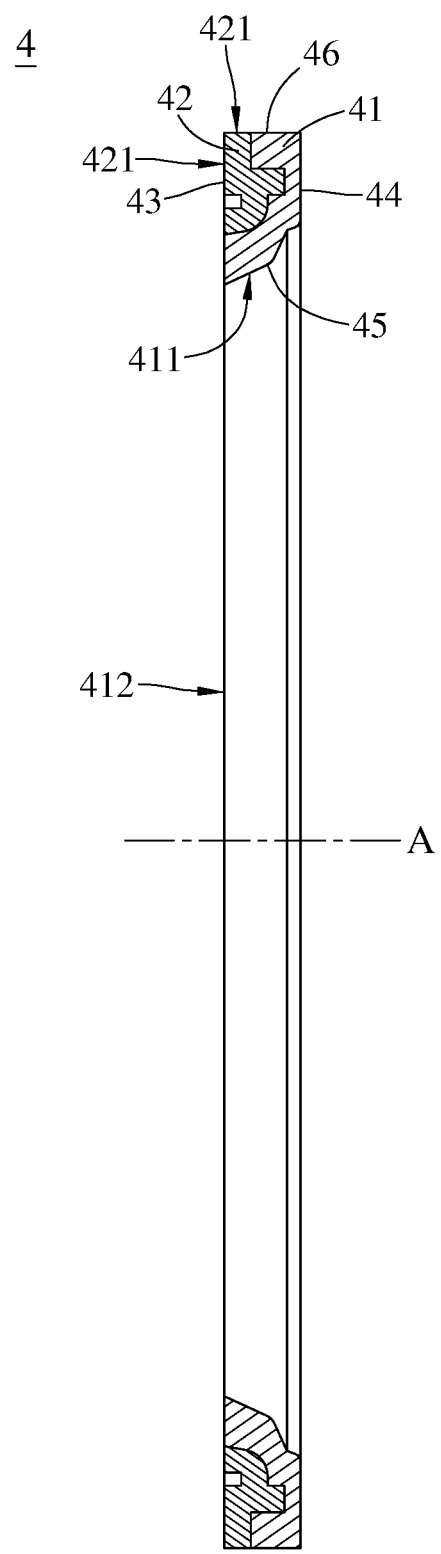
FIG. 10 is a cross-sectional view of the annular optical component according to the 4th embodiment of the present disclosure.
Figure 11:
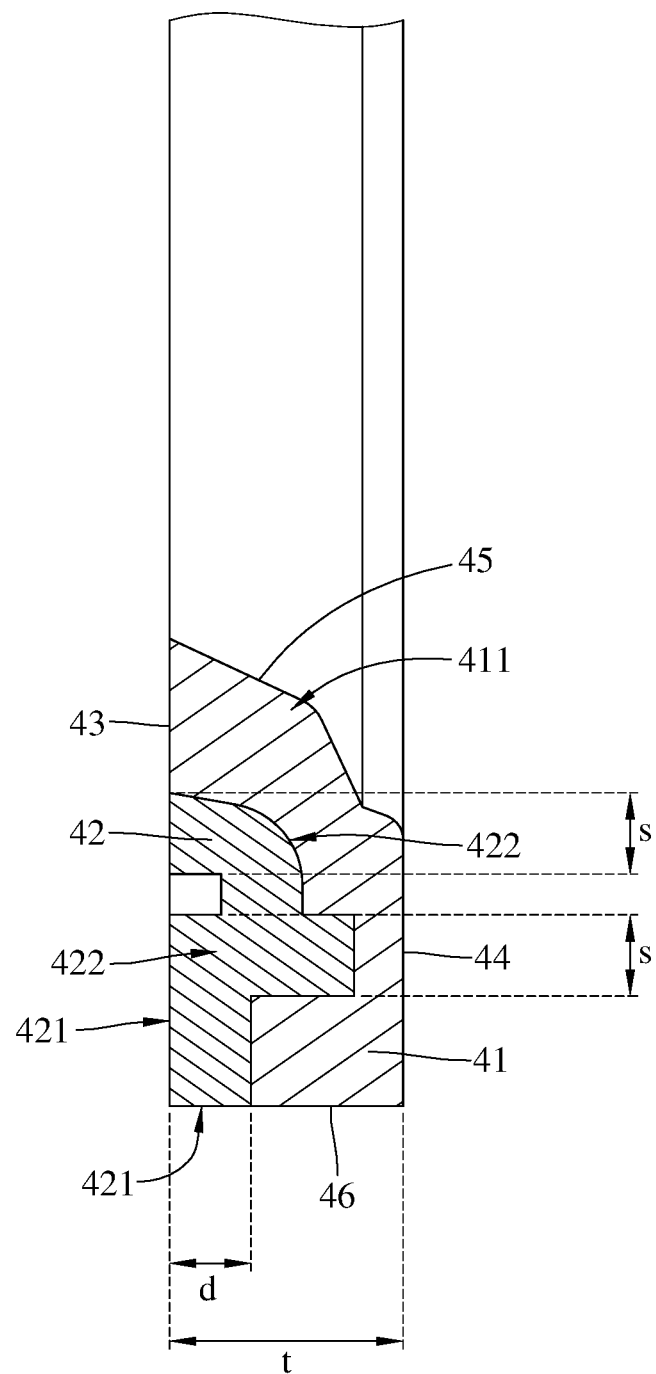
FIG. 11 is an enlarged view of the annular optical component in FIG. 10.

Please refer to FIG. 10 and FIG. 11. FIG. 10 is a cross-sectional view of the annular optical component according to the 4th embodiment of the present disclosure. FIG. 11 is an enlarged view of the annular optical component in FIG. 10. In this embodiment, an annular optical component 4 includes a plastic element 41 and a metal element 42. An object-side surface 43 of the annular optical component 4 faces an object-side direction of the annular optical component 4, and an image-side surface 44 of the annular optical component 4 faces an image-side direction of the annular optical component 4. The image-side surface 44 and the object-side surface 43 are opposite to each other, and both the image-side surface 44 and the object-side surface 43 are connected to an inner annular surface 45 and an outer annular surface 46 of the annular optical component 4 which are opposite to each other.

The plastic element 41 includes a plastic part 411. The plastic part 411 includes the entire inner annular surface 45. The plastic part 411 surrounds a central axis A of the annular optical component 4 so as to form a central opening 412. The central opening 412 is tapered from the image-side surface 44 to the object-side surface 43.

The metal element 42 is insert-molded with the plastic element 41. The metal element 42 surrounds central opening 412 of the annular optical component 4. The metal element 42 includes a metal part 421, and at least part of the metal part 421 includes part of the outer annular surface 46. In detail, the metal part 421 extends from the outer annular surface 46 to the object-side surface 43, and the metal part 421 on the object-side surface 43 are exposed. In this embodiment, the metal element 42 further includes two folding structures 422. The folding structures 422 are circle-shaped structures which surround the central opening 412 of the annular optical component 4.

A thickness of the metal part 421 of the metal element 42 on the outer annular surface 46 is d, the maximum thickness of the annular optical component 4 is t and the following condition is satisfied: d/t=0.35.

A distance between the folding structures 422 of the metal element 42 in a direction perpendicular to the central axis A of the annular optical component 4 is s, the thickness of the metal part 421 of the metal element 42 on the outer annular surface 46 is d, and the following condition is satisfied: s/d=1.00.

The distance between the folding structures 422 on the direction perpendicular to the central axis A of the annular optical component 4 is s, and the maximum thickness of the annular optical component 4 is t, and the following condition is satisfied: s/t=0.348.

5th Embodiment

Figure 12:
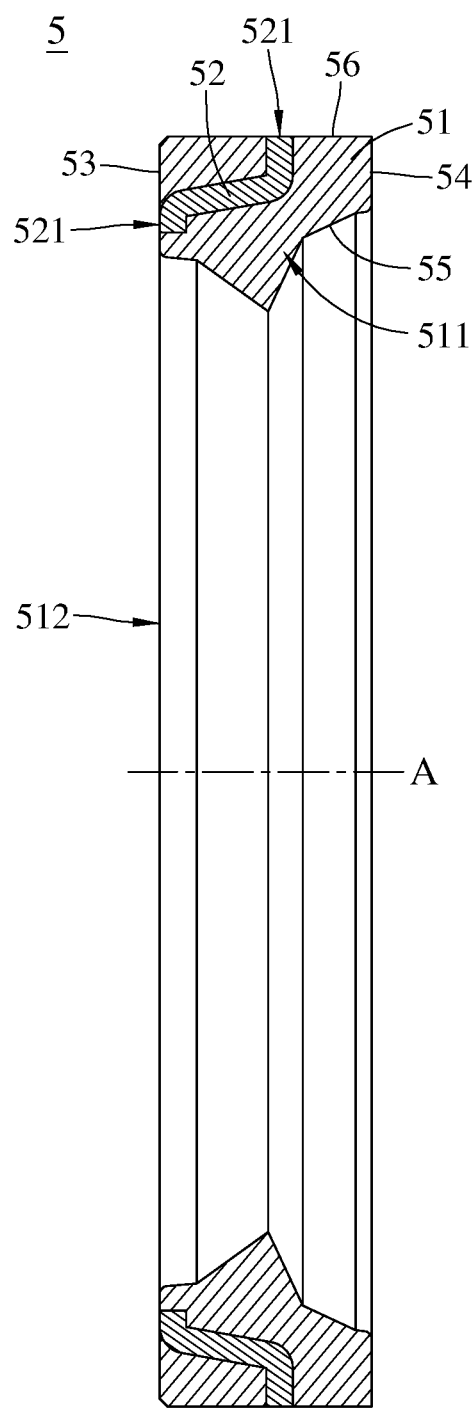
FIG. 12 is a cross-sectional view of the annular optical component according to the 5th embodiment of the present disclosure.
Figure 13:
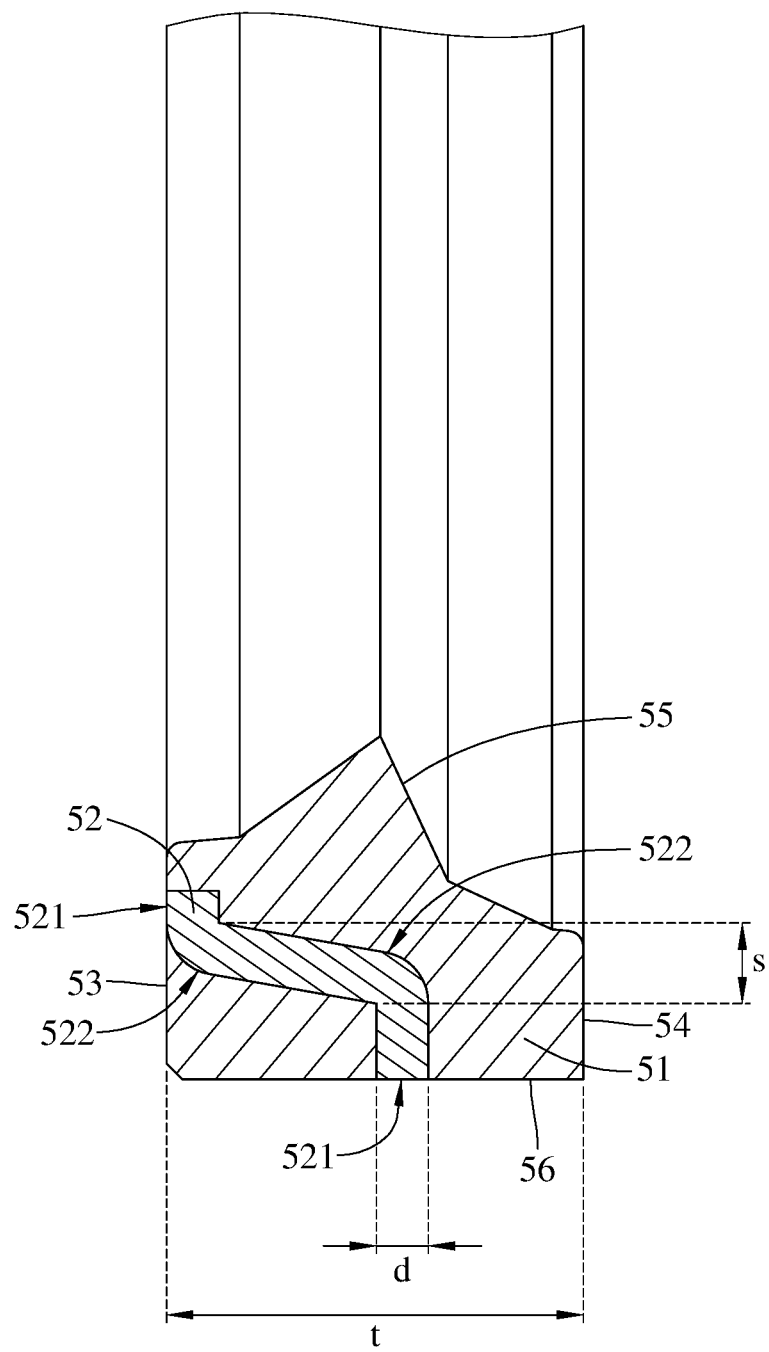
FIG. 13 is an enlarged view of the annular optical component in FIG. 12.

Please refer to FIG. 12 and FIG. 13. FIG. 12 is a cross-sectional view of the annular optical component according to the 5th embodiment of the present disclosure. FIG. 13 is an enlarged view of the annular optical component in FIG. 12. In this embodiment, an annular optical component 5 includes a plastic element 51 and a metal element 52. An object-side surface 53 of the annular optical component 5 faces an object-side direction of the annular optical component 5, and an image-side surface 54 of the annular optical component 5 faces an image-side direction of the annular optical component 5. The image-side surface 54 and the object-side surface 53 are opposite to each other, and both of the image-side surface 54 and the object-side surface 53 are connected to an inner annular surface 55 and an outer annular surface 56 of the annular optical component 5 which are opposite to each other.

The plastic element 51 includes a plastic part 511. The plastic part 511 includes the entire inner annular surface 55. The plastic part 511 surrounds a central axis A of the annular optical component 5 so as to form a central opening 512. The central opening 512 is tapered from the image-side surface 54 to the object-side surface 53. In this embodiment, the plastic element 51 contains a chemical compound fiber.

The metal element 52 is insert-molded with the plastic element 51. The metal element 52 surrounds the central opening 512 of the annular optical component 5, and the metal element 52 has a uniform thickness. The metal element 52 includes a metal part 521, and at least part of the metal part 521 is exposed. In this embodiment, the metal element 52 further includes two folding structures 522. The folding structures 522 are circle-shaped structures which surround the central opening 512 of the annular optical component 5.

A thickness of the metal part 521 of the metal element 52 on the outer annular surface 56 is d, the maximum thickness of the annular optical component 5 is t, and the following condition is satisfied: d/t=0.125.

A distance between the folding structures 522 of the metal element 52 in a direction perpendicular to the central axis A of the annular optical component 5 is s, the thickness of the metal part 521 of the metal element 52 on the outer annular surface 56 is d, and the following condition is satisfied: s/d=1.55.

The distance between the folding structures 522 in the direction perpendicular to the central axis A of the annular optical component 5 is s, the maximum thickness of the annular optical component 5 is t, and the following condition is satisfied: s/t=0.19.

6th Embodiment

Figure 14:
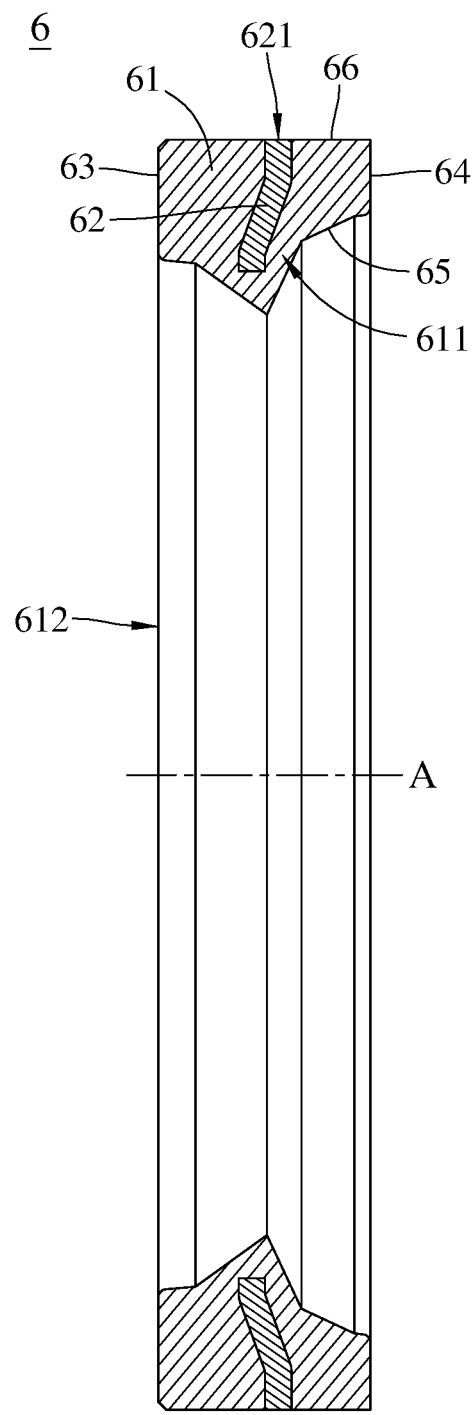
FIG. 14 is a cross-sectional view of the annular optical component according to the 6th embodiment of the present disclosure.
Figure 15:
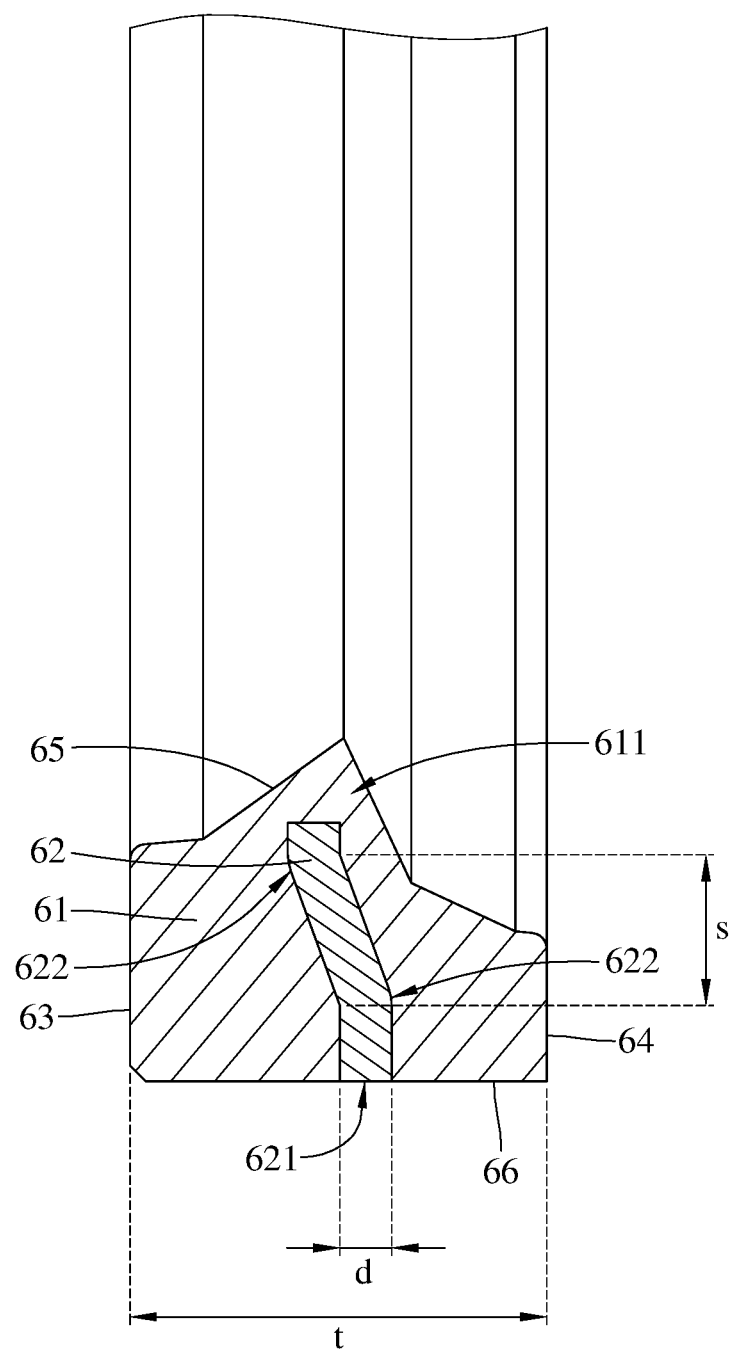
FIG. 15 is an enlarged view of the annular optical component in FIG. 14.

Please refer to FIG. 14 and FIG. 15. FIG. 14 is a cross-sectional view of the annular optical component according to the 6th embodiment of the present disclosure. FIG. 15 is an enlarged view of the annular optical component in FIG. 14. In this embodiment, an annular optical component 6 includes a plastic element 61 and a metal element 62. An object-side surface 63 of the annular optical component 6 faces an object-side direction of the annular optical component 6, and an image-side surface 64 of the annular optical component 6 faces an image-side direction of the annular optical component 6. The image-side surface 64 and the object-side surface 63 are opposite to each other, and both of the image-side surface 64 and the object-side surface 63 are connected to an inner annular surface 65 and an outer annular surface 66 of the annular optical component 6 which are opposite to each other.

The plastic element 61 includes a plastic part 611. The plastic part 611 includes the entire inner annular surface 65. The plastic part 611 surrounds a central axis A of the annular optical component 6 so as to form a central opening 612. The central opening 612 is tapered from the image-side surface 64 to the object-side surface 63. In this embodiment, the plastic element 61 contains a chemical compound fiber.

The metal element 62 is insert-molded with the plastic element 61. The metal element 62 surrounds the central opening 612 of the annular optical component 6, and the metal element 62 has a uniform thickness. The metal element 62 includes a metal part 621, and the metal part 621 is exposed from the outer annular surface 66. In this embodiment, the metal element 62 further includes two folding structures 622. The folding structures 622 are circle-shaped structures which surround the central opening 612 of the annular optical component 6.

A thickness of the metal part 621 of the metal element 62 on the outer annular surface 66 is d, the maximum thickness of the annular optical component 6 is t, and the following condition is satisfied: d/t=0.126.

A distance between the folding structures 622 of the metal element 62 in a direction perpendicular to the central axis A of the annular optical component 6 is s, the thickness of the metal part 621 of the metal element 62 on the outer annular surface 66 is d, and the following condition is satisfied: s/d=2.9.

The distance between the folding structures 622 in the direction perpendicular to the central axis A of the annular optical component 6 is s, the maximum thickness of the annular optical component 6 is t, and following condition is satisfied: s/t=0.36.

7th Embodiment

Figure 16:
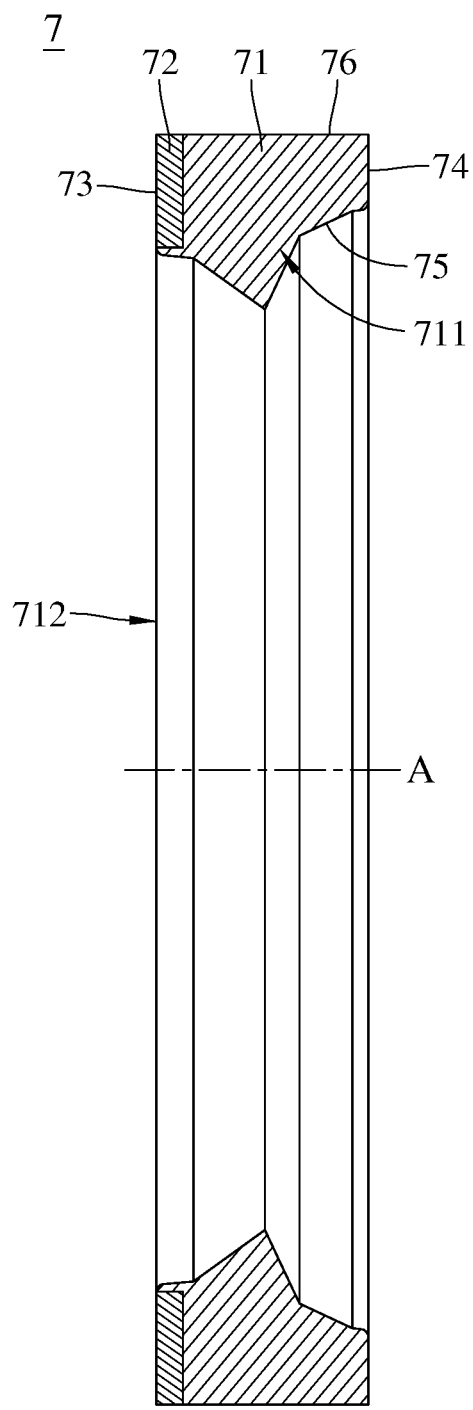
FIG. 16 is a cross-sectional view of the annular optical component according to the 7th embodiment of the present disclosure.
Figure 17:
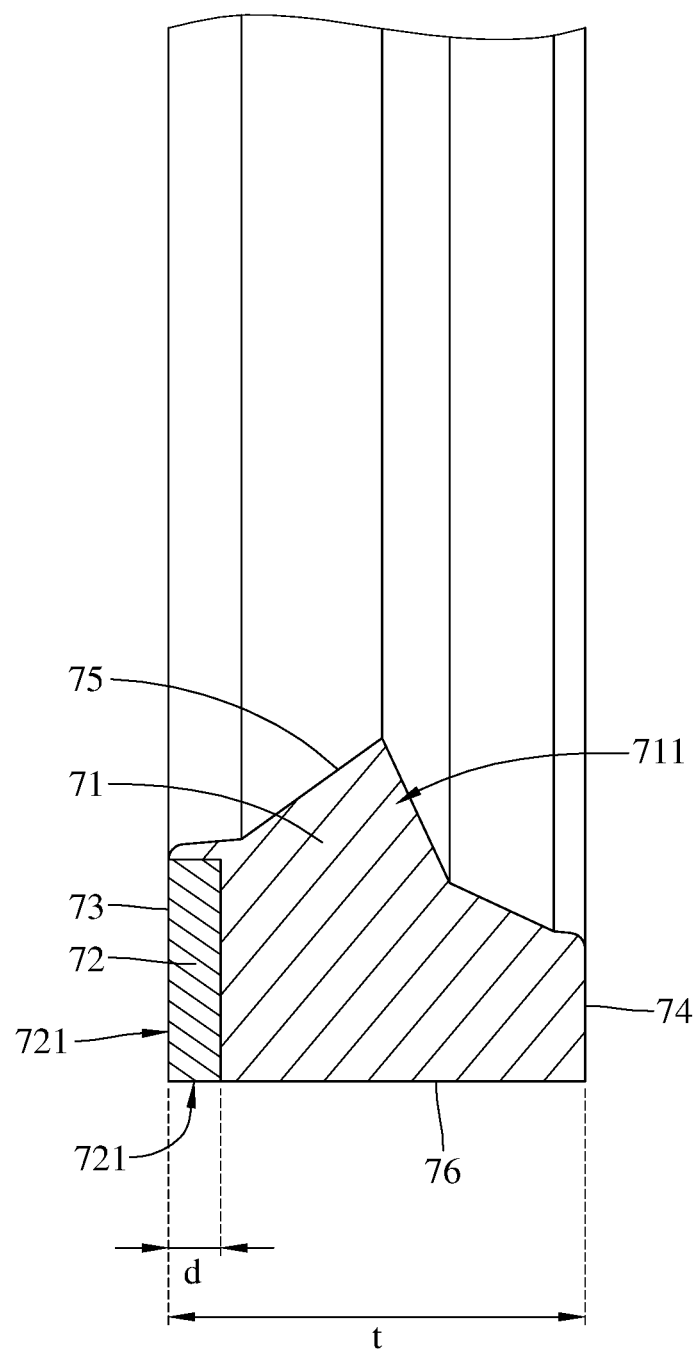
FIG. 17 is an enlarged view of the annular optical component in FIG. 16.

Please refer to FIG. 16 and FIG. 17. FIG. 16 is a cross-sectional view of the annular optical component according to the 7th embodiment of the present disclosure. FIG. 17 is an enlarged view of the annular optical component in FIG. 16. In this embodiment, an annular optical component 7 includes a plastic element 71 and a metal element 72. An object-side surface 73 of the annular optical component 7 faces an object-side direction of the annular optical component 7, an image-side surface 74 of the annular optical component 7 faces an image-side direction of the annular optical component 7. The image-side surface 74 and the object-side surface 73 are opposite to each other, and both of the image-side surface 74 and the object-side surface 73 are connected to an inner annular surface 75 and an outer annular surface 76 of the annular optical component which are opposite to each other.

The plastic element 71 includes a plastic part 711. The plastic part 711 includes the entire inner annular surface 75. The plastic part 711 surrounds a central axis A of the annular optical component 7 so as to form a central opening 712. The central opening 712 is tapered from the image-side surface 74 to the object-side surface 73. In this embodiment, the plastic element 71 contains a chemical compound fiber.

The metal element 72 is insert-molded with the plastic element 71. The metal element 72 surrounds the central opening 712 of the annular optical component 7, and the metal element 72 has a uniform thickness. The metal element 72 includes a metal part 721, and at least part of the metal part 721 includes part of the outer annular surface 76. In detail, the metal part 721 extends from the outer annular surface 76 to the object-side surface 73, and the metal part 721 on the object-side surface 73 is exposed.

A thickness of the metal part 721 of the metal element 72 on the outer annular surface 76 is d, the maximum of the annular optical component 7 is t, and the following condition is satisfied: d/t=0.125.

8th Embodiment

Figure 18:
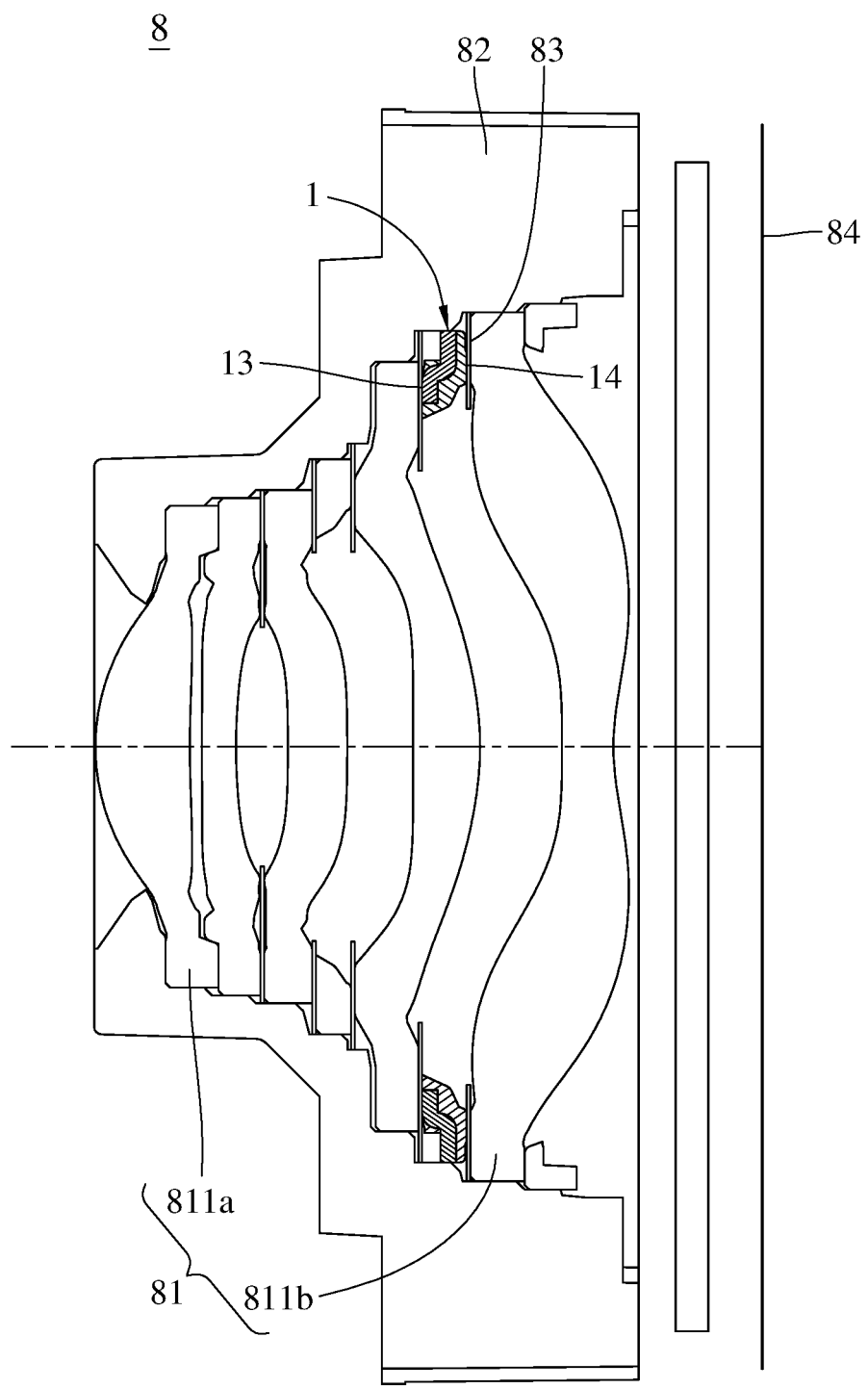
FIG. 18 is a schematic view of a camera lens according to the 8th embodiment of the present disclosure.

Please refer to FIG. 18. FIG. 18 is a schematic view of a camera lens according to the 8th embodiment of the present disclosure. In this embodiment, a camera lens 8 includes the annular optical component 1 of the first embodiment, an imaging lens assembly 81, a barrel 82, a light blocking film 83 and an image sensor 84. The imaging lens assembly 81 includes a plurality of lens elements which are arranged sequentially.

The annular optical component 1 and the lens elements are disposed in the barrel 82. The object-side surface 13 of the annular optical component 1 faces an object side of the camera lens 8, and the image-side surface 14 of the annular optical component 1 faces an object side of the camera lens 8. The lens elements of the imaging lens assembly 81 includes an object-side lens element 811a, which is closest to the object side, and an image-side lens element 811b, which is closest to the image side. The annular optical component 1 is disposed between the object-side lens element 811a and the image-side lens element 811b. The light blocking film 83 is disposed between the image-side lens element 811b and the annular optical component 1.

9th Embodiment

Figure 19:
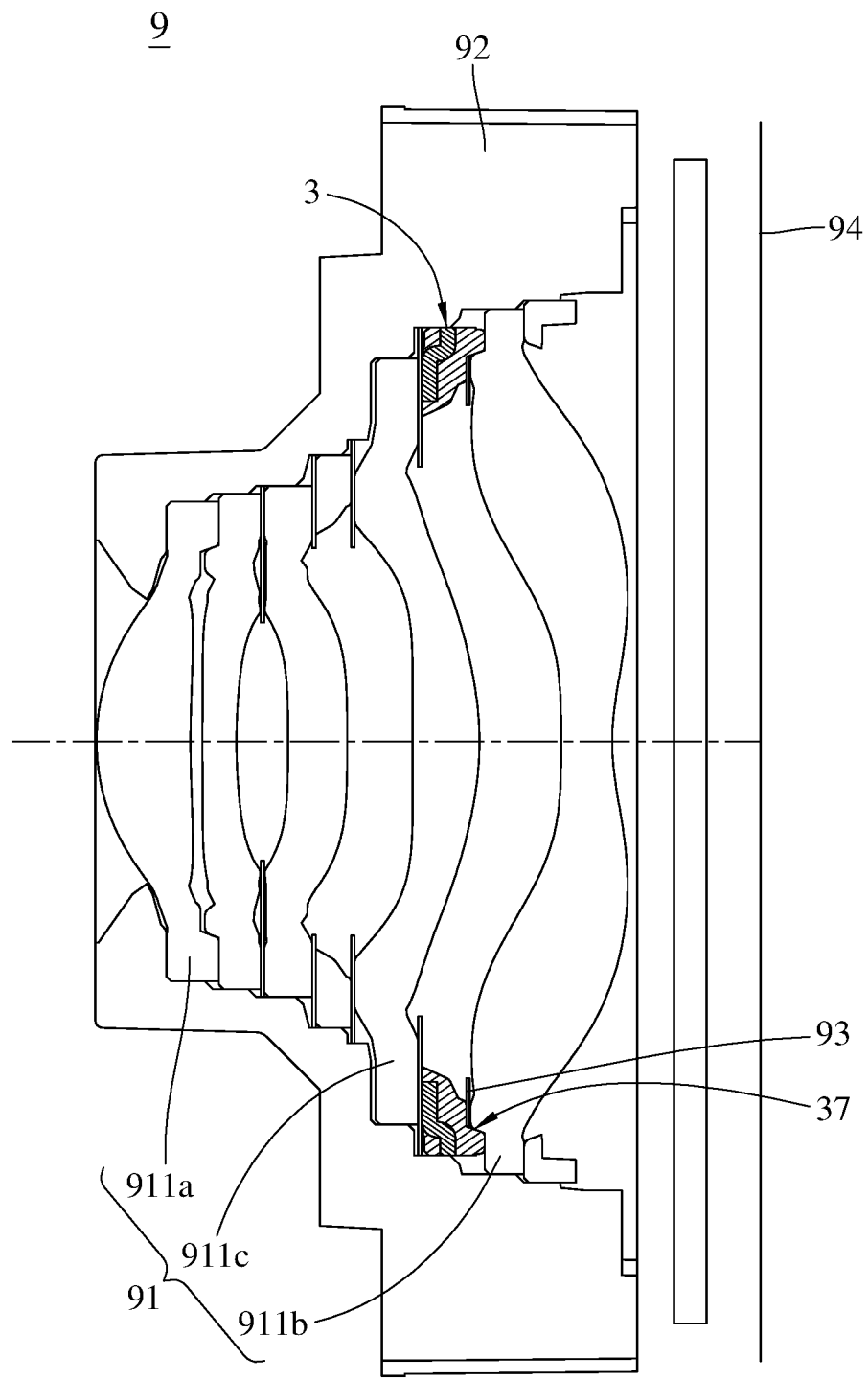
FIG. 19 is a schematic view of a camera lens according to the 9th embodiment of the present disclosure.

Please refer to FIG. 19. FIG. 19 is a schematic view of a camera lens according to the 9th embodiment of the present disclosure. In this embodiment, a camera lens 9 includes the annular optical component 3 of the third embodiment, an imaging lens assembly 91, a barrel 92, a light blocking film 93 and an image sensor 94. The imaging lens assembly 91 includes a plurality of lens elements which are arranged sequentially.

The annular optical component 3 and the lens elements are disposed in the barrel 92. The object-side surface 33 of the annular optical component 3 faces an object side of the camera lens 9, and the image-side surface 34 of the annular optical component 3 faces an image side of the camera lens 9. The lens elements of the imaging lens assembly 91 includes an object-side lens element 911a, which are closest to the object side, and an image-side lens element 911b, which is closest to the image side. The annular optical component 3 is disposed between the object-side lens element 911a and the image-side lens element 911b. The light blocking film 93 is disposed between the image-side lens element 911b and the annular optical component 3.

The annular optical component 3 is clamped by two lens elements which are adjacent to each other. In detail, the annular optical component 3 further includes an axially assembled structure 37 which is located on the image-side surface 34. The annular optical component 3 is disposed on the imaging lens assembly 91 via the axially assembled structure 37. The axially assembled structure 37 is configured to align the center of a middle lens element 911c adjacent to the annular optical component 3 with the center of the image-side lens element 911b.

10th Embodiment

Figure 20:
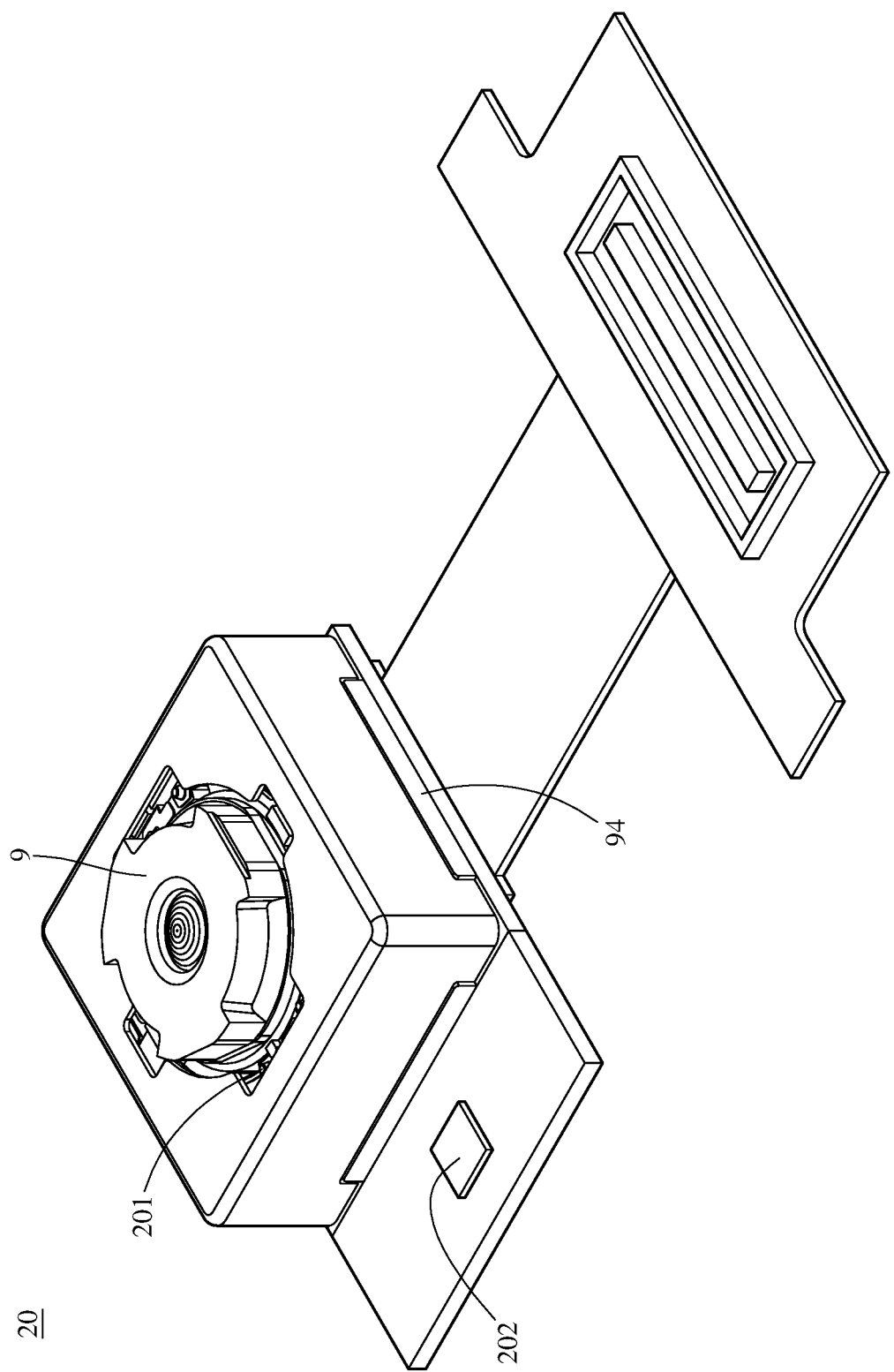
FIG. 20 is a perspective view of an image capturing unit according to the 10th embodiment of the present disclosure.

FIG. 20 is a perspective view of an image capturing unit according to the 10th embodiment of the present disclosure. In this embodiment, an image capturing unit 20 is a camera module including a camera lens 9 discussed in the 9th embodiment, a driving device 201 and an image stabilizer 202. The imaging light converges into the camera lens 9 of the image capturing unit 20 to generate an image with the driving device 201 utilized for image focusing on an image sensor 94 of the camera lens 9, and the generated image is then digitally transmitted to other electronic component for further processing.

The driving device 201 can have auto focusing functionality, and different driving configurations can be obtained through the usages of voice coil motors (VCM), micro electro-mechanical systems (MEMS), piezoelectric systems, or shape memory alloy materials. The driving device 201 is favorable for obtaining a better imaging position of the camera lens 9, so that a clear image of the imaged object can be captured by the camera lens 9 with different object distances. The image sensor 94 (for example, CCD or CMOS), which can feature with high photosensitivity and low noise, is disposed on the image surface of the optical imaging lens assembly to provide higher image quality.

The image stabilizer 202, such as an accelerometer, a gyroscope and a Hall Effect sensor, is configured to work with the driving device 201 to provide optical image stabilization (OIS). The driving device 201 working with the image stabilizer 202 is favorable for compensating for pan and tilt of the camera lens 9 to reduce blurring associated with motion during exposure. In some cases, the compensation can be provided by electronic image stabilization (EIS) with image processing software, thereby improving the image quality while in motion or low-light conditions.

11th Embodiment

Figure 21:
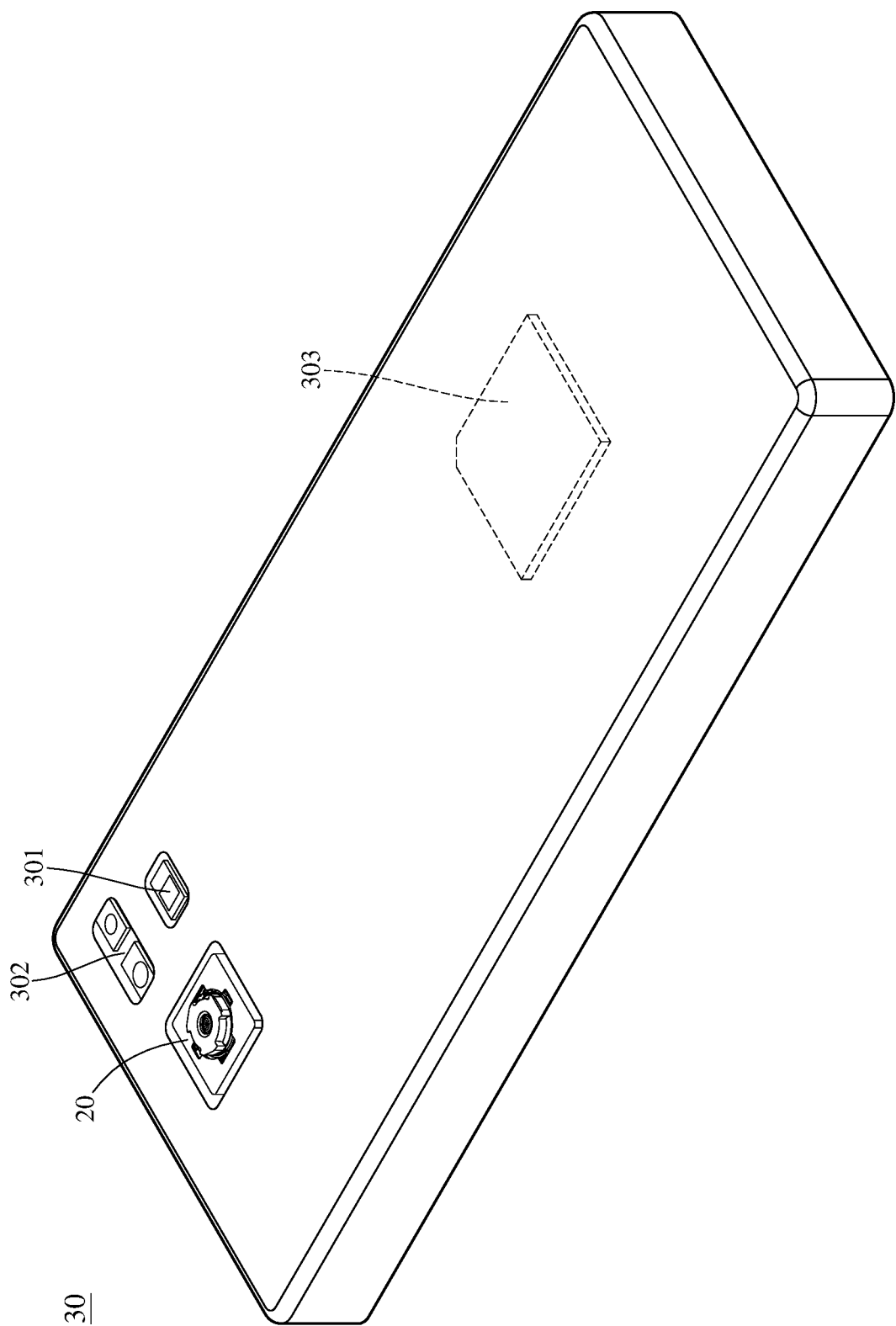
FIG. 21 is a perspective view of an electronic device according to the 11th embodiment of the present disclosure.
Figure 22:
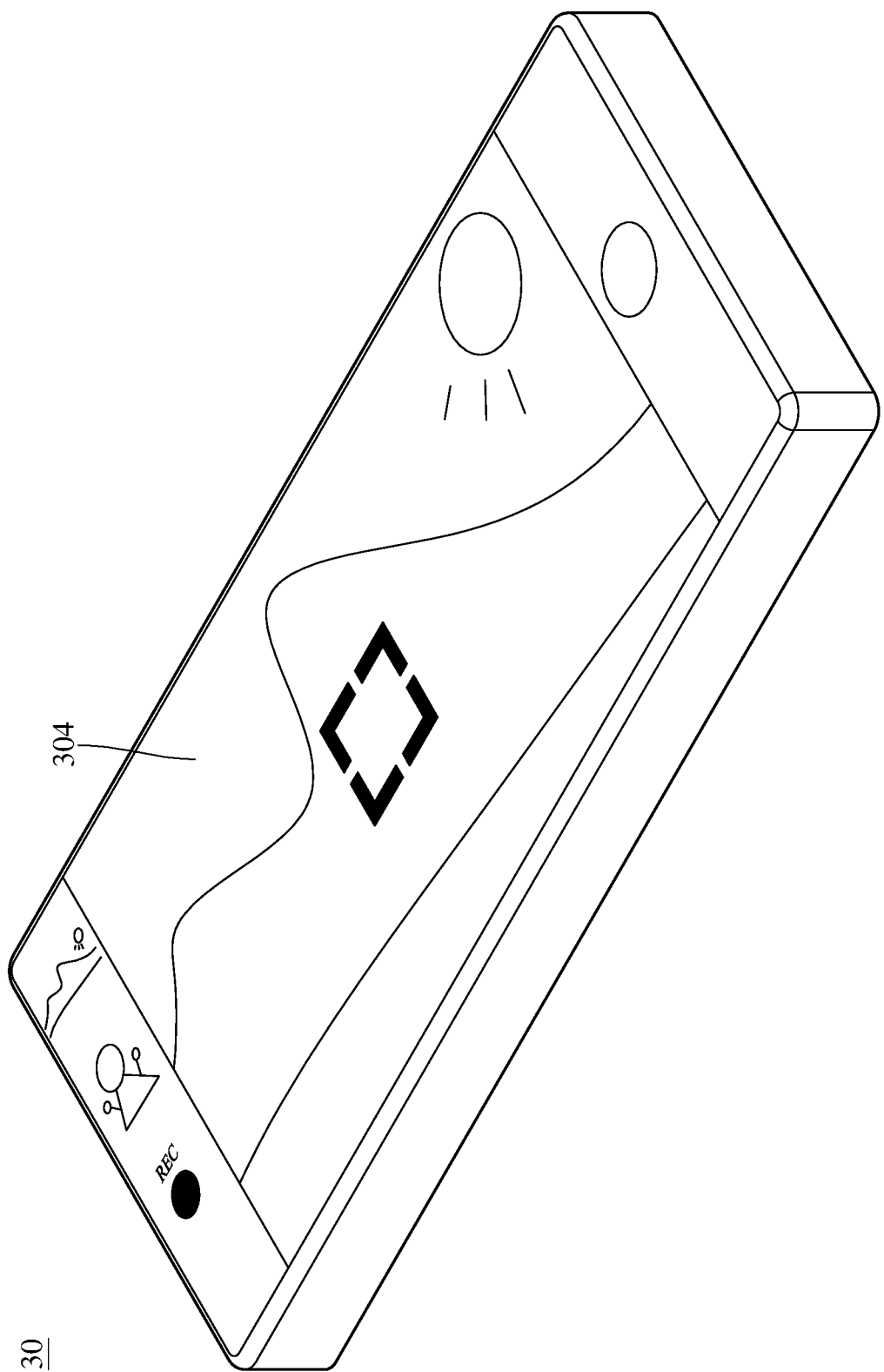
FIG. 22 is another perspective view of the electronic device in FIG. 21.

Please refer to FIG. 21 and FIG. 22. FIG. 21 is a perspective view of an electronic device according to the 11th embodiment of the present disclosure. FIG. 22 is another perspective view of the electronic device in FIG. 21. In this embodiment, an electronic device 30 is a smartphone including the image capturing unit 20 disclosed in the 10th embodiment, a flash module 301, a focus assist module 302, an image signal processor 303 and a user interface 304. The quantity of the image capturing unit is not restricted in one.

When a user captures images of an object, the light rays converge in the image capturing unit 20 to generate an image, and the flash module 301 is activated for light supplement. The focus assist module 302 detects the object distance of the imaged object to achieve fast auto focusing. The image signal processor 303 is configured to optimize the captured image to improve image quality. The light beam emitted from the focus assist module 302 can be either conventional infrared or laser. The user interface 304 can be a touch screen or a physical button. The user is able to interact with the user interface 304 and an image software processor having multiple functions to capture images and complete image processing. The image processed by the image software processor can be displayed on the user interface 304.

Figure 23:
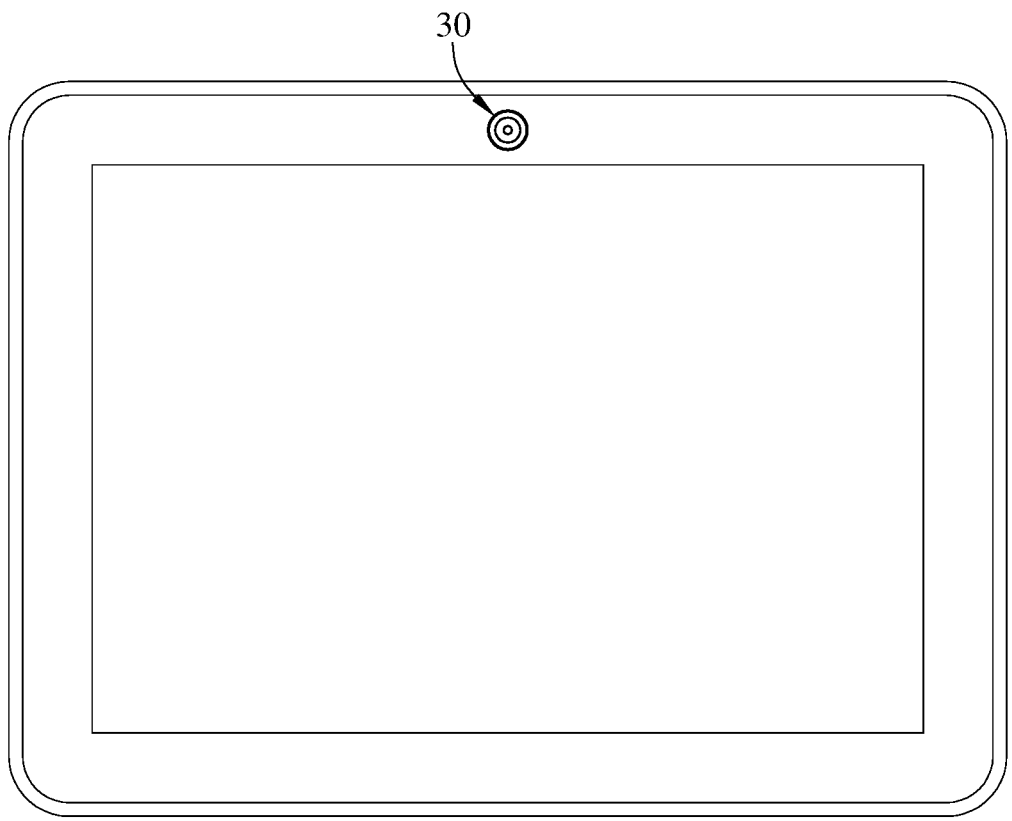
FIG. 23 is a schematic view of another electronic device of the present disclosure.
Figure 24:
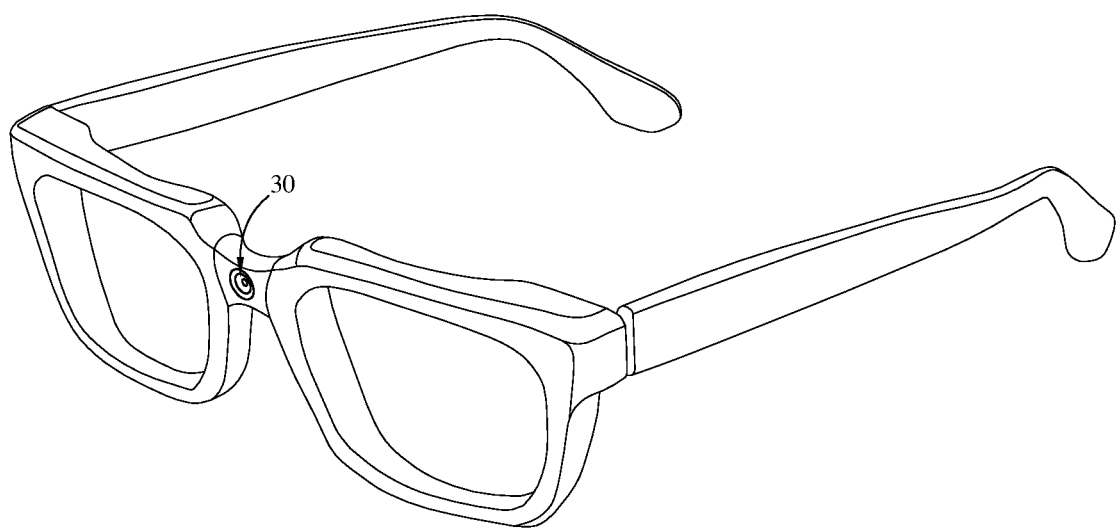
FIG. 24 is a schematic view of still another electronic device of the present disclosure.
Figure 25:
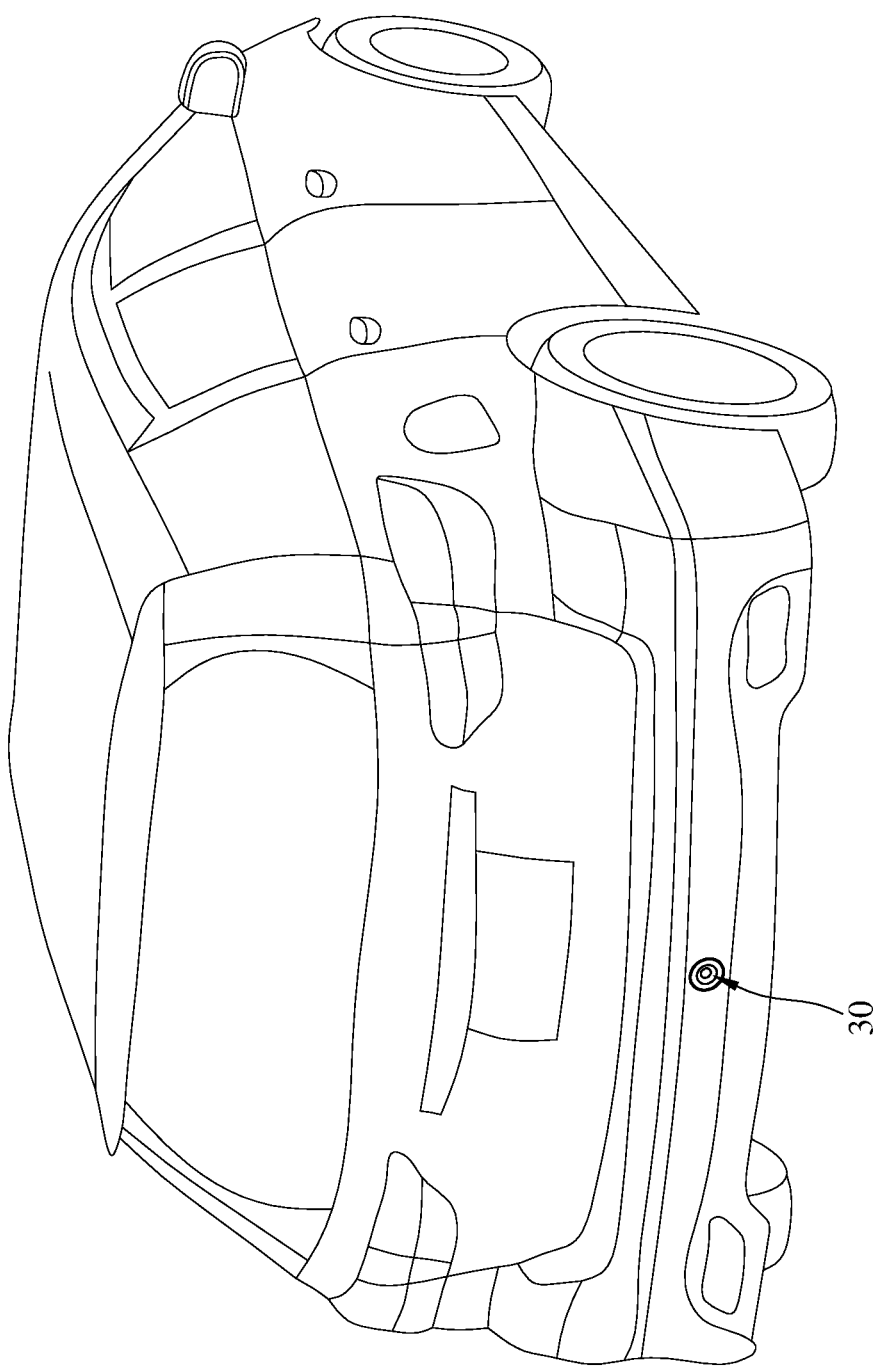
FIG. 25 is a schematic view of still yet another electronic device of the present disclosure.

The electronic device 30 in this embodiment is only exemplary for showing the image capturing unit 20 of the present disclosure installed in a smartphone, and the present disclosure is not limited thereto. The image capturing unit 20 can be optionally applied to a tablet computer (e.g., as shown in FIG. 23), a wearable device (e.g., as shown in FIG. 24) and a vehicle backup cameras (e.g., as shown in FIG. 25). Furthermore, the annular optical component and the camera lens of the disclosure can be applied to 3D (three-dimensional) image capturing applications or in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An annular optical component, comprising a plastic element and a metal element disposed on the plastic element, the plastic element comprising a plastic part, and the metal element comprising a metal part;

wherein the plastic part comprises at least part of an inner annular surface of the annular optical component, the plastic part surrounds a central axis of the annular optical component so as to form a central opening, at least part of the metal part comprises at least part of an outer annular surface of the annular optical component, the outer annular surface and the inner annular surface are opposite to each other, an object-side surface of the annular optical component faces an object side direction of the annular optical component and is connected to the outer annular surface and the inner annular surface, an image-side surface of the annular optical component faces an image-side direction of the annular optical component and is connected to the outer annular surface and the inner annular surface, and the image-side surface and the object-side surface are opposite to each other;

wherein a thickness of the metal part on the outer annular surface is d, the maximum thickness of the annular optical component is t, and the following condition is satisfied:

$$0.05 < d/t < 1.0.$$

2. The annular optical component of claim 1, wherein the metal element is insert-molded with the plastic element.

3. The annular optical component of claim 2, wherein the metal element comprises at least one folding structure.

4. The annular optical component of claim 3, wherein the quantity of the at least one folding structure is equal to or larger than two.

5. The annular optical component of claim 4, wherein a distance between the at least one folding structures in a direction perpendicular to the central axis of the annular optical component is s, the thickness of the metal part on the outer annular surface is d, and the following condition is satisfied:

$$0.6 < s/d < 3.0.$$

6. The annular optical component of claim 2, wherein the metal part of the metal element extends from the outer annular surface to at least one of the object-side surface and the image-side surface, and the metal part on one of the object-side surface and the image-side surface is exposed.

7. The annular optical component of claim 6, wherein the metal part extends from the outer annular surface only to one of the object-side surface and the image-side surface.

8. The annular optical component of claim 1, wherein the plastic element comprises a chemical compound fiber.

9. A camera lens, comprising the annular optical component of claim 1 and an imaging lens assembly, wherein the annular optical component is disposed in the imaging lens assembly.

10. The camera lens of claim 9, wherein the imaging lens assembly comprises an object-side lens element and an image-side lens element, and the annular optical component is disposed between the object-side lens element and the image-side lens element.

11. The camera lens of claim 10, further comprising a light blocking film which is disposed between the image-side lens element and the annular optical component.

12. The camera lens of claim 11, wherein the central opening of the annular optical component is tapered from the image-side surface to the object-side surface.

13. The camera lens of claim 11, wherein the thickness of the metal part on the outer annular surface is d, the maximum thickness of the annular optical component is t, and the following condition is satisfied:

$$0.05 < d/t < 0.6.$$

14. The camera lens of claim 11, wherein the plastic part of the plastic element comprises the entire inner annular surface of the annular optical component.

* * * * *